(12) United States Patent
Yuuki et al.

(10) Patent No.: US 7,139,053 B2
(45) Date of Patent: Nov. 21, 2006

(54) DOUBLE-SIDED LIQUID CRYSTAL DISPLAY DEVICE

(75) Inventors: Akimasa Yuuki, Tokyo (JP); Tomohiro Sasagawa, Tokyo (JP); Naoto Sugawara, Tokyo (JP); Takashi Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/227,216

(22) Filed: Sep. 16, 2005

(65) Prior Publication Data

US 2006/0007372 A1   Jan. 12, 2006

Related U.S. Application Data

(63) Continuation of application No. 10/432,169, filed as application No. PCT/JP02/05645 on Jun. 7, 2002, now Pat. No. 7,002,649.

(30) Foreign Application Priority Data

Sep. 14, 2001 (JP) ............... 2001-279527
Mar. 27, 2002 (JP) ............... 2002-88476

(51) Int. Cl.
*G02F 1/1335* (2006.01)
(52) U.S. Cl. ............... 349/114; 349/63; 349/117
(58) Field of Classification Search ............... 349/1, 349/63, 114, 115
See application file for complete search history.

(56) References Cited

U.S. PATENT DOCUMENTS

| 5,686,979 | A | 11/1997 | Weber et al. |
| 6,254,249 | B1 | 7/2001 | Kim et al. |
| 6,266,119 | B1 | 7/2001 | Takahashi et al. |
| 6,295,109 | B1 | 9/2001 | Kubo et al. |
| 6,574,487 | B1 | 6/2003 | Smith et al. |
| 6,879,354 | B1 | 4/2005 | Sawayama et al. |
| 2001/0017679 | A1 | 8/2001 | Ha et al. |
| 2001/0050716 | A1 | 12/2001 | Hashimoto et al. |
| 2004/0021809 | A1 | 2/2004 | Sumiyoshi et al. |

FOREIGN PATENT DOCUMENTS

| JP | 7-218899 | 8/1995 |
| JP | 8-163638 | 6/1996 |
| JP | 10-186362 | 7/1998 |
| JP | 10-326515 | 12/1998 |
| JP | 11-133419 | 5/1999 |
| JP | 2000-193956 | 7/2000 |
| JP | 2001-83494 | 3/2001 |
| JP | 2001-215509 | 8/2001 |
| KR | 2001-0064973 | 7/2001 |

*Primary Examiner*—Andrew Schechter
(74) *Attorney, Agent, or Firm*—Leydig, Voit & Mayer, Ltd.

(57) ABSTRACT

A double-sided liquid crystal display device including a liquid crystal material, first and second electrodes for driving the liquid crystal material, first and second polarizers disposed on opposite sides of the liquid crystal material, a front light disposed at the opposite side of the first polarizer from the liquid crystal material, and a semitransmission reflector disposed at the same side of the liquid crystal material as the second polarizer for passing a part of light from the front light side passing through the liquid crystal. The first polarizer is disposed to absorb or transmit light passing through the liquid crystal material, and the second polarizer is disposed to absorb or transmit light passing through the liquid crystal material and then passing through the semitransmission reflector.

2 Claims, 21 Drawing Sheets

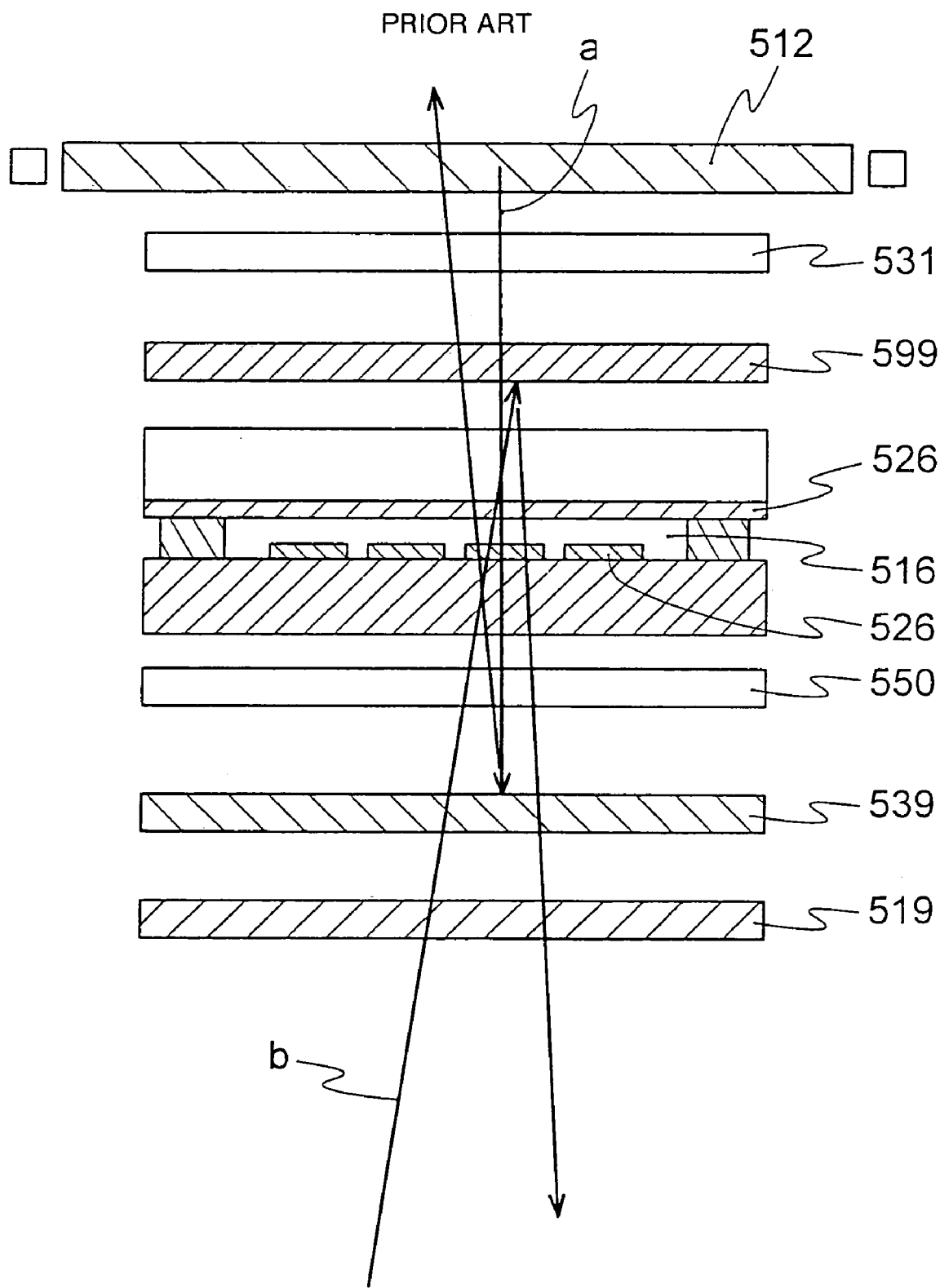

DOUBLE-SIDED LIQUID CRYSTAL DISPLAY DEVICE

This disclosure is a continuation of U.S. patent application Ser. No. 10/432,169, filed May 20, 2003, now U.S. Pat. No. 7,002,649.

TECHNICAL FIELD

The present invention relates to a double-sided liquid crystal display device allowing the display image to be recognized from both face and reverse sides, and an information appliance using the same, such as mobile phone, personal digital assistant (PDA), and wristwatch.

BACKGROUND ART

Prior Art 1

A prior art of liquid crystal display device is disclosed, for example, in Japanese Unexamined Patent Publication No. 10-326515, in which a reflection type liquid crystal display element having a reflector is provided, and a front illumination device (front light) is disposed in front of the reflection type liquid crystal element, and this reflection type liquid crystal display device is used by turning off the front light where a sufficient quantity of ambient light is available, for example, in an outdoor place during daytime, and is used by lighting the front light where sufficient quantity of ambient light is not obtained.

Prior Art 2

Other prior art of liquid crystal display device is a semitransmission reflection type liquid crystal display device for making reflection type display using external light in a bright place, or transmission type display by backlight in a dark place.

As proposed, for example, in Japanese Unexamined Patent Publication No. Hei 10-186362, this semitransmission reflection liquid crystal display device has a liquid crystal display panel 100 including front side polarizing means, front side transparent plate, a transmission liquid crystal display unit, a back side transparent plate, and back side polarizing means, as shown in a sectional view of FIG. 19, in which a backlight 120 composed of a fluorescent lamp, a reflector and a triangular light-conducting plate is disposed at the opposite side (back side) of the observation side of this liquid crystal display panel 100, and semitransmission reflecting means 110 composed of half mirror or magic mirror having aluminum or the like affixed to a thin transparent film base by vapor deposition, with the film base being adhered, for example, to the back side of the back side polarizing means, is disposed between the backlight 120 and the transmission type liquid crystal display unit. In FIG. 19, reference numeral 130 denotes a light scattering plate comprising prism plate or diffusion film, 140 a circuit board for driving the liquid crystal display panel 100, and 150 a casing accommodating the liquid crystal display panel 100, semitransmission reflecting means 110, backlight 120, scattering plate 130 and circuit board 140.

In the semitransmission reflection type liquid crystal display device having such configuration, in a bright place, external light is taken in as indicated by arrow b, and reflection type display is made by making use of the light reflected by the semitransmission reflecting means 110, and in a dark place, the backlight 120 is lit, and transmission type display is made so that the display might be recognized by the light passing through the semitransmission reflecting means 110 as indicated by arrow a.

Prior Art 3

A different example of semitransmission reflection type liquid crystal display device is disclosed, for example, in Japanese Unexamined Patent Publication No. 2001-083494, that is, as shown in a sectional view of FIG. 20, this semitransmission reflection liquid crystal display device comprises a transparent first substrate 210; a transparent second substrate 220 disposed opposite to this first substrate 210, and having a color filter, a transparent electrode and an alignment film disposed at the side opposite to the first substrate 210; a liquid crystal 230 interposed between the first substrate 210 and second substrate 220; a backlight 240 disposed at the opposite side of the liquid crystal 230 of the first substrate 210; a transparent second insulation film 250 disposed at the side opposite to the second substrate 220 of the first substrate 210; a reflection electrode 260 disposed on the second insulation film 250 and having an opening for passing light from the backlight 240; a transparent first insulation film 270 disposed on the reflection electrode layer 260; and an alignment film 280 disposed on the first insulation film 270. In FIG. 20, moreover, reference numeral 291 denotes a polarizer, 292 a phase difference plate, and 293 a sealing material.

The semitransmission reflection type liquid crystal display device having such configuration can display by changing over between reflection type display using the light reflected by the reflection electrode 260 by taking in external light, and transmission type display using the light passing through the opening in the reflection electrode 260 emitted from the backlight 240. Further, in this prior art 3, unlike prior art 2, there is no transparent electrode between the reflecting means and the liquid crystal, and the optical path is shorter in the reflection type display, and therefore the parallax in display image is reduced and the brightness in display image is enhanced.

Prior Art 4

A conventional information appliance disclosed, for example, in Japanese Unexamined Patent Publication No. Hei 8-163638, is a mobile phone comprising, as shown in a perspective view of FIG. 21, a first main body having various operation switches, and a second main body having a liquid crystal display device connected thereto in an opening and closing manner for visibly displaying various kinds of information, and when the second main body is opened, a large screen image display is possible by the liquid crystal display device, and when the second main body is closed, it is reduced to a compact size suited to portable use. In FIG. 21, specifically, reference numeral 301 denotes the first main body having various function switches 307 including alphanumerical input switches, 302 denotes the second main body having the liquid crystal display device 304 for visibly displaying various kinds of information and coupled to the first main body 301 in an opening and closing manner, 303 denotes a coupling unit of the first main body 301 and second main body 302, 305 denotes an antenna, and 306 denotes a button switch for validating the inside and outside range display function when the second main body 302 is manipulated in closed state. Reference numeral 308 denotes a lamp displaying "inside" or "outside", and specifically the inside range is displayed in a green light and the outside range in a red light, or the range is indicated by lighting or flickering, so that the inside and outside can be known at a glance.

In the information appliance having such configuration, when the button switch 306 is manipulated in the closed state of the second main body 302, the display lamp 308 displays, so that either "inside" or "outside" of the range can be visually recognized easily.

The conventional liquid crystal display device is thus constituted, and whether in reflection type liquid crystal display device or semitransmission reflection type liquid crystal display device, there is only one display panel, and there is even no idea about liquid crystal display device capable of displaying in both face and reverse sides.

In the conventional folding type information appliance, when the second main body is closed, although the inside or outside of the range can be visually recognized by the lit color, or lighting or flickering of the display lamp disposed separately from the liquid crystal display device, the display image by the liquid crystal display device cannot be recognized visually in the closed state of the second main body same as in the opened state. As a countermeasure, there might be considered to add an extra liquid crystal display device exclusive for closed state of the second main body, but the number of parts is increased, and hence the weight, volume and cost are increased.

Prior Art 5

Other conventional information appliance is an electronic appliance disclosed, for example, in Japanese Unexamined Patent Publication No. 2000-193956, which is one liquid crystal display device comprising, as shown in FIG. 22, a liquid crystal 516 enclosed by a pair of first reflection polarizer 599 and first absorption type polarizer 531, and second reflection polarizer 539 and second absorption type polarizer 519; and a light source light-conducting plate 512 disposed at the outermost side. In a bright place, reflection type image can be seen by making use of external light b from both sides, and in a dark place, by emitting light a from the light source light-conducting plate 512, a bright reflection screen can be observed through the light-conducting plate from the light source light-conducting plate 512 side, or from the opposite side, a bright transmission image can be seen.

Here, reference numeral 526 denotes a transparent electrode for driving the liquid crystal 516, and 550 a scattering layer.

However, in the liquid crystal display device disclosed in Japanese Unexamined Patent Publication No 2000-193956 and the electronic appliance using the same, when the surrounding is slightly bright, if the image is observed from the opposite side of the light source light-conducting plate 512, since the external light b is insufficient, the brightness is not enough even in the liquid crystal element driven by the transparent electrode 526 so that the external light b is reflected by the first reflection polarizer 599 to be displayed in white. At this time, to increase the brightness of the image, if the light source light-conducting plate 512 is lit to emit light a, the polarized light a after passing through the first reflection polarizer 599 and first absorption type polarizer 531 is reflected by the second reflection polarizer 539 in this liquid crystal element, and cannot pass, so that the brightness cannot be increased.

To the contrary, in the case of the liquid crystal display device being driven so that the external light b passes through the first reflection polarizer 599 and is not reflected to be displayed in black, the polarized light a passing through the first reflection polarizer 599 and first absorption type polarizer 531 is not reflected by the second reflection polarizer 539, but passes through the same, and hence the black display becomes bright and the contrast is lowered, thereby the display quality deteriorates.

The present invention is made to solve the problems of these prior arts, and it is a first object thereof to present a double-sided display type liquid crystal display device capable of displaying a bright image of excellent display quality on both face and reverse sides.

It is a second object thereof to present an information appliance allowing to recognize a display image by one liquid crystal display device in both opened state and closed state of a second main body, without adding a new image display device.

DISCLOSURE OF INVENTION

A double-sided display type liquid crystal display device of the present invention includes a liquid crystal, first and second electrodes for driving the liquid crystal, first and second polarizing means disposed on both sides of the liquid crystal, a front light disposed at the opposite side of the liquid crystal of the first polarizing means, and semitransmission reflecting means disposed at the second polarizing means side of the liquid crystal for passing a part of light from the front light side passing through the liquid crystal, in which the first polarizing means is optically disposed so as to absorb or transmit light passing through the liquid crystal, and the second polarizing means is optically disposed so as to absorb or transmit light passing through the liquid crystal and then passing through the semitransmission reflecting means.

Moreover, the semitransmission reflecting means is a reflector disposed between the liquid crystal and the second polarizing means, and having a transmission window for passing a part of light from the front light side passing through the liquid crystal.

Moreover, the first and second electrodes are transparent electrodes disposed between the liquid crystal and first polarizing means and the liquid crystal and second polarizing means respectively, and the reflector having a transmission window is disposed at the opposite side of the liquid crystal of the second electrode.

Moreover, the semitransmission reflecting means is a reflection polarizer disposed between the liquid crystal and the second polarizing means, for reflecting light having a specified polarizing characteristic and passing all other light.

Further, the device includes first and second glass substrates holding the liquid crystal therebetween and disposed between the liquid crystal and the first and second polarizing means respectively, and a color filter at either liquid crystal side of the first or second glass substrate; the reflection polarizer is adhered to the opposite side of the liquid crystal of the second substrate; and the thickness of the second substrate is 5 times or less of the narrowest width of the color filter.

Further, the device includes a metal wiring electrically connected to the first electrode or second electrode, and a first quarter λ phase difference plate is disposed between the metal wiring and first polarizing means when the metal wiring is located between the liquid crystal and the first polarizing means, or between the metal wiring and reflection polarizer when the metal wiring is located between the liquid crystal and reflection polarizer.

Further, the device includes a metal wiring electrically connected to the first electrode or second electrode, and a low reflection layer of lower reflectivity of light than that of the metal wiring disposed at the opposite side of the liquid crystal of the metal wiring, the low reflection layer being optically disposed closely in a shape after the metal wiring.

An information appliance of the present invention includes a first main body having various operation switches, and a second main body having display means for visually displaying various kinds of information, being coupled to the first main body in an opening and closing manner. The display means is a double-sided display type liquid crystal display device including a liquid crystal, first and second electrodes for driving the liquid crystal, first and second polarizing means disposed on both sides of the liquid crystal, a front light disposed at the opposite side of the liquid crystal of the first polarizing means, and semitransmission reflecting means disposed at the second polarizing means side of the liquid crystal for passing a part of light from the front light side passing through the liquid crystal; windows are disposed at the inner side of the casing and at the outer side thereof when the second main body is closed; the surface of the front light side of the double-sided display type liquid crystal display device is disposed at one window; and the surface of the second polarizing means side of the double-sided display type liquid crystal display device is disposed at the other window.

The surface of the double-sided display type liquid crystal display device on the front light side is disposed at the window provided at the outer side of the second main body, and the surface of the double-sided display type liquid crystal display device on the second polarizing means side is disposed at the window provided at the inner side.

The appliance further includes opening/closing judging means for judging the opening or closing of the second main body, and a front light lighting switch which cooperates with the opening/closing judging means for lighting the front light when the main body is judged to be opened.

The appliance further includes writing direction inverting means for inverting the writing direction of display image data into each pixel of the double-sided display type liquid crystal display device in vertical or lateral direction.

The appliance further includes data converting means for converting the data of display image into data inverted in vertical or lateral direction.

The appliance further includes data converting means for converting the gradation of the data of display image.

The appliance further includes a second quarter λ phase difference plate disposed at the opposite side of the liquid crystal of the second polarizing means of the double-sided display type liquid crystal display device.

BRIEF DESCRIPTION OF DRAWINGS

FIG. 22 is a diagram explaining a double-sided display type liquid crystal display device in Prior Art 5.

BEST MODE FOR CARRYING OUT THE INVENTION

Embodiment 1

An example of a foldable mobile phone according to Embodiment 1 of the present invention is explained below with reference to the drawings.

Figure 1:
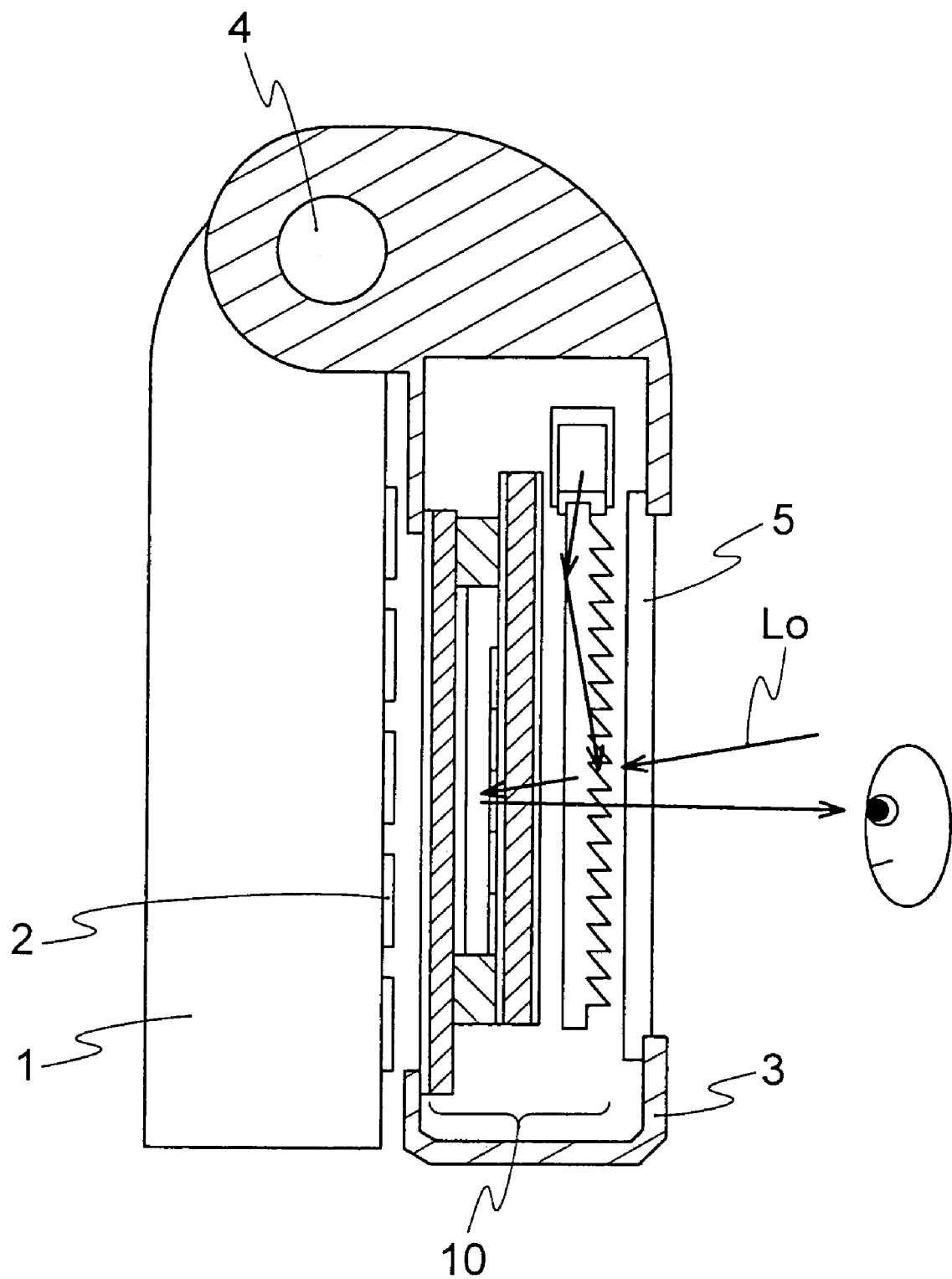
FIG. 1 is a diagram explaining a double-sided display type liquid crystal display device and an information appliance using the same according to Embodiment 1 of the present invention.
Figure 2:
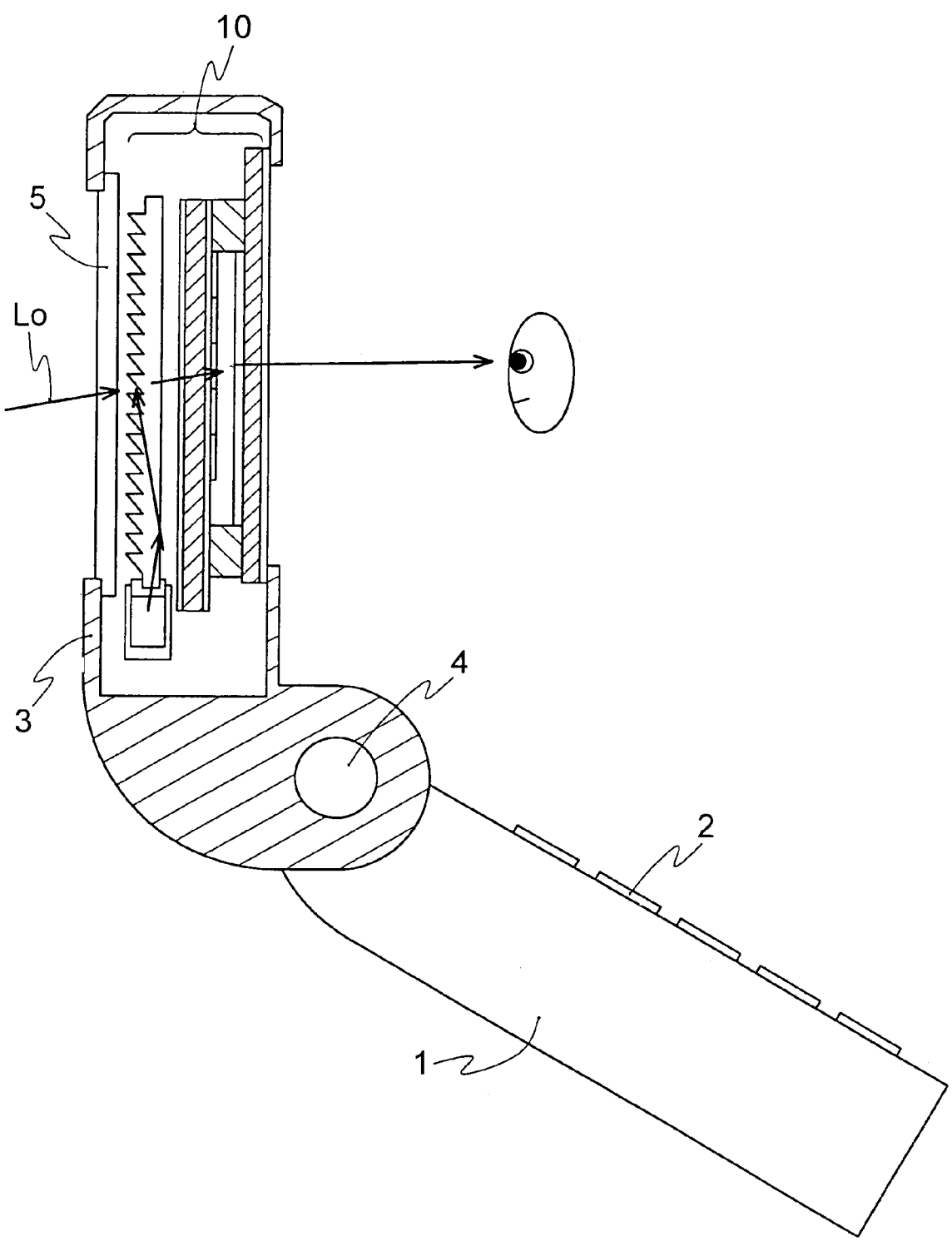
FIG. 2 is a diagram explaining the double-sided display type liquid crystal display device and the information appliance using the same according to Embodiment 1 of the present invention.
Figure 3:
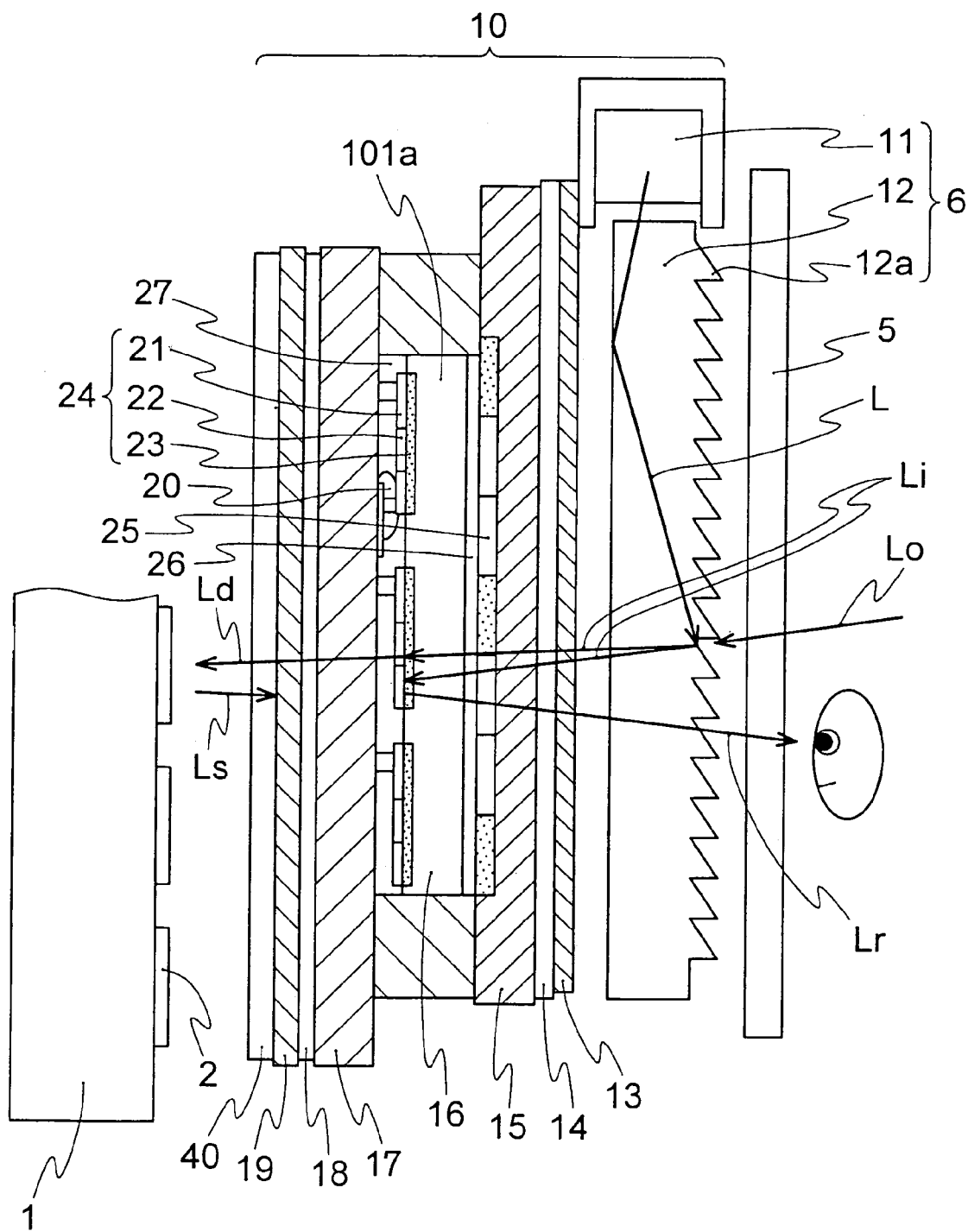
FIG. 3 is a diagram explaining the double-sided display type liquid crystal display device and the information appliance using the same according to Embodiment 1 of the present invention.
Figure 4:
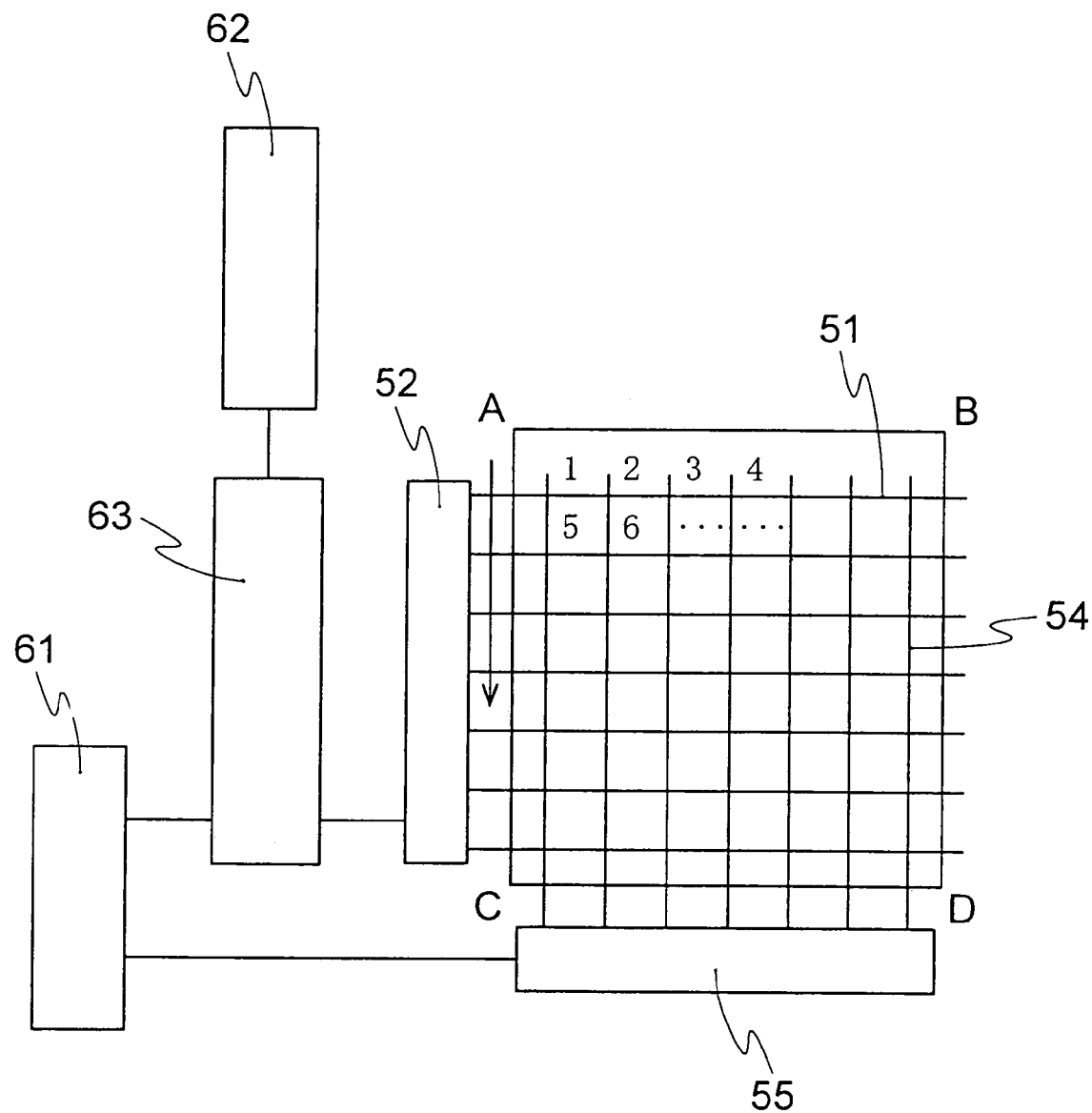
FIG. 4 is a diagram explaining the double-sided display type liquid crystal display device and the information appliance using the same according to Embodiment 1 of the present invention.
Figure 5:
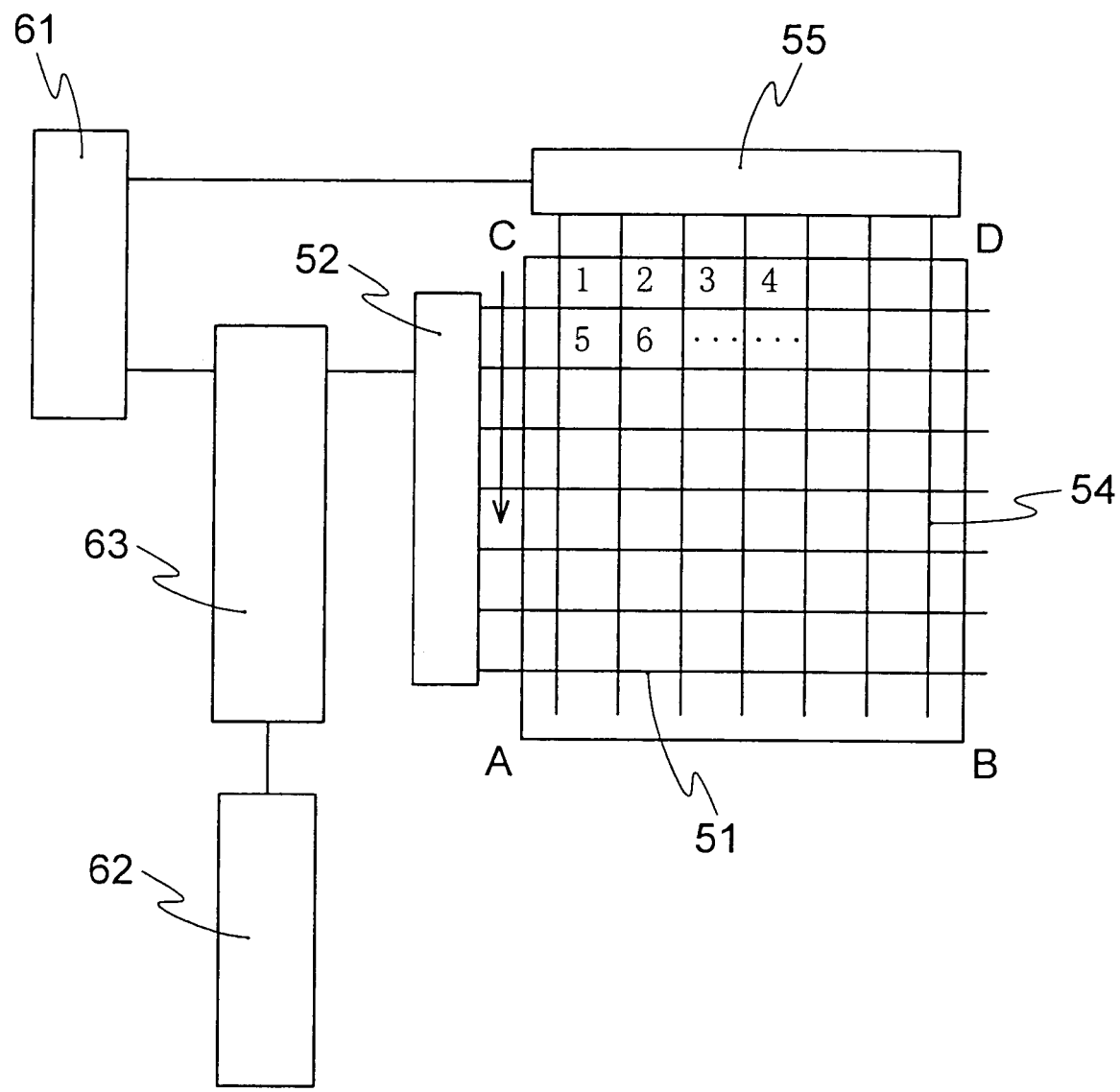
FIG. 5 is a diagram explaining the double-sided display type liquid crystal display device and the information appliance using the same according to Embodiment 1 of the present invention.

FIG. 1 to FIG. 5 are diagrams explaining a double-sided display type liquid crystal display device and an information appliance using the same according to Embodiment 1 of the present invention, and more specifically FIG. 1 is a partially cut-away appearance view showing a folded state (closed state of second main body) of a foldable mobile phone as an information appliance, FIG. 2 is a partially cut-away appearance view showing an opened state of the second main body, FIG. 3 is a sectional view magnifying essential parts in FIG. 1, FIG. 4 is a diagram explaining the writing direction of display image data into each pixel of the double-sided display type liquid crystal display device in the closed state of the second main body, and FIG. 5 is a diagram explaining the writing direction of display image data into each pixel of the double-sided display type liquid crystal display device in the opened state of the second main body.

In FIG. 1 and FIG. 2, reference numeral 1 denotes a first main body having various operation switches 2, 3 a second main body having a double-sided display type liquid crystal display device for visually displaying various kinds of information, 4 a hinge for coupling the second main body 3 to the first main body 1 in an opening and closing manner, and 5 a transparent cover. A double-sided display type liquid crystal display device 10 is described later in detail with the use of FIG. 3.

A foldable mobile phone of the Embodiment comprises a first main body 1 having various function switches 2 including alphanumeric input switches, and a second main body 3 having a double-sided display type liquid crystal display device 10 for visibly displaying various kinds of information as display means. The second main body 3 is coupled to the first main body 1 by a hinge 4 so as to be openable and closable. Openings (windows) are provided at both the outer side coming to the outside and the inner side coming to the inside when the second main body 3 is closed, and a transparent cover 5 is provided at the outer side opening (the window provided at the outer side) so as to dispose the front light side surface of the double-sided display type liquid crystal display device 10, and the surface of the double-sided display type liquid crystal display device 10 on the second polarizing means side is provided at the inner side opening (the window provided at the inner side), thereby composing a display unit.

In FIG. 3, reference numeral 6 denotes a front light having a light source 11 composed of light-emitting diode (LED) and a light-conducting plate 12, 12a a reflection prism provided in the light-conducting plate 12,13 a color filter (CF) side polarizer corresponding to first polarizing means, 14 a CF side phase difference plate, 15 a CF side glass substrate corresponding to transparent first substrate, 16 a liquid crystal layer, 17 a thin film transistor (TFT) array side glass substrate corresponding to transparent second substrate, 18 a TFT array side phase difference plate, 19 a TFT array side polarizer corresponding to second polarizing means, 20 a gate TFT, 21 a reflection electrode having a transmission window 22, 23 a TFT array side transparent electrode corresponding to second electrode, 25 a CF, 26 a CF side transparent electrode corresponding to first electrode, 27 a transparent insulation film, and 40 a quarter λ phase difference plate (second quarter λ phase difference plate). Reference numeral 101a denotes a liquid crystal display panel having the liquid crystal 16 and first and second electrodes 26 and 23 for driving the liquid crystal 16, and in this Embodiment it further includes the reflection electrode 21 having the transmission window 22 (corresponding to the reflector having the transmission window for passing a part of light from the front light 6 side passing through the liquid crystal 16), and this is a semitransmission type liquid crystal display panel for passing a part of light passing through the liquid crystal 16 and reflecting the remainder. The liquid crystal 16 is driven by the first electrode 26 and second electrode 23, and the quantity of birefringence of the liquid crystal 16 is controlled.

In this Embodiment, a pixel electrode 24 is composed of the reflection electrode 21 having the transmission window 22 and the TFT array side transparent electrode 23, and the pixel electrode 24 are aligned in an array on the TFT array side glass substrate 17.

The double-sided display type liquid crystal display device 10 of the Embodiment mainly comprises the following members. That is, it comprises a transparent first substrate 15 having a transparent first electrode 26 formed thereon, a transparent second substrate 17 having a transparent second electrode 23 formed thereon and disposed oppositely to the first substrate 15, a liquid crystal 16 held between the first substrate 15 and second substrate 17, first polarizing means 13 and second polarizing means 19 disposed respectively at the opposite side of the liquid crystal 16 of the first substrate 15 and second substrate 17, semi-transmission reflection means 21, 22 disposed between the liquid crystal 16 and second polarizing means 19 for passing a part of light passing through the first substrate 15 and liquid crystal 16, and a front light 6 disposed at the opposite side of the first substrate 15 of the first polarizing means 13.

More specifically, the double-sided display type liquid crystal display device 10 of the Embodiment comprises a front light 6 composed of a light source 11 and a front light light-conducting plate 12, a CF side glass substrate 15 having a CF 25 and a CF side transparent electrode 26, a TFT array side glass substrate 17, a liquid crystal 16 of, for example, TN liquid crystal enclosed by these two glass substrates 15, 17, a reflection electrode 21 having a transmission window 22 for passing a part of light backward, a TFT array side transparent electrode 23 to which a voltage is applied through a gate TFT 20 same as the reflection electrode 21, a phase difference plate 18, a second polarizer (TFT array side polarizer 19) and a quarter λ phase difference plate 40 sequentially adhered to the TFT array side glass substrate 17, and a phase difference plate 14 and a first polarizer (CF side polarizer 13) sequentially adhered to the color filter side glass substrate 15.

When the second main body 3 is closed, the inner side of the first main body 1 is opposite to the quarter λ phase difference plate 40.

Referring now to FIG. 1, FIG. 3 and FIG. 4, there is explained the operation of the double-sided display type liquid crystal display device of the Embodiment and the foldable mobile phone using the same when its second main body 3 is closed, relating to a case of lighting of the front light 6. As shown in FIG. 1, when the second main body 3 is closed, the surface of the front light 6 side of the double-sided display type liquid crystal display device 10 is shown to the user side.

In FIG. 3, as indicated by arrow L, the light emitted from the light source 11 spreads by diffusing and propagating through the light-conducting plate 12, and is radiated to the CF side polarizer 13 as indicated by arrow Li by a reflection prism 12a provided in the light-conducting plate 12. The radiated light enters the CF side polarizer 13 to be a straight polarized light, and passes through the CF side phase difference plate 14, first substrate 15, liquid crystal 16, and TFT array side transparent electrode 23, and reaches the reflection electrode 21. Further, as indicated by arrow Lr, it is reflected by the reflection electrode 21 to be a reflected light, which passes again through the liquid crystal 16, first substrate 15, CF side phase difference plate 14, CF side polarizer 13, front light 6, and transparent cover 5, and is visually recognized by the user at the front light 6 side of the double-sided display type liquid crystal display device 10 (reflection type display).

At this time, depending on the quantity of birefringence of the liquid crystal 16 layer determined by the electric field between the voltage applied to the pixel electrode 24 and the CF side transparent electrode 26, and on the quantity of birefringence of the CF side phase difference plate 14, the transmissivity of the reflected light indicated by arrow Lr when passing through the CF side polarizer 13 varies in a range of 0 to 1, and accordingly by setting the voltage applied to the pixel electrode 24, in every pixel, depending on the image, the image display is realized. Usually it is set to heighten the transmissivity when the electric field is 0, and lower the transmissivity to 0 when the electric field becomes stronger.

FIG. 4 is a diagram explaining the writing direction of the image display data when the second main body is closed into each pixel of the double-sided display type liquid crystal display device, showing the display image of the double-sided display type liquid crystal display device 10 seen from the CF side glass substrate (first substrate) 15 side. In FIG. 4, reference numeral 51 denotes a gate line, 52 a gate driver, 54 a source line, and 55 a source driver. A plurality of gate lines 51 and source lines 54 are disposed each in the vertical direction and lateral direction, and a pixel composed of gate TFT 20 and pixel electrode 24 is disposed at each intersection. Reference numeral 61 denotes an image signal generating device, 62 opening/closing judging means for judging the opening or closing of the second main body 3, and 63 writing direction inverting means for inverting the writing direction of display image data into each pixel of the double-sided display type liquid crystal display device in the vertical direction, corresponding to the opening or closing of the second main body 3, in collaboration with the opening/closing judging means 62.

The image signal generating device 61 is composed of, for example, frame memory and CPU, and sequentially generates image signals to be written into each pixel of the double-sided display type liquid crystal display device and writing timing signals.

The opening/closing judging means 62 is composed of, for example, cantilever and switch, and judges whether the second main body 3 is closed or open by detecting, for example, the angle of the hinge 4.

The writing direction inverting means 63 is composed of, for example, electronic circuit, and controls, for example, the gate driver 52, changes over the start gate and shift direction of the shift register, and inverts the selection sequence of gate lines 51, such as from corner A to C when the second main body 3 is closed, or from corner C to A when the second main body 3 is open, thereby inverting the writing direction of display image data into each pixel of the liquid crystal display device in the vertical direction without changing the sequence of the image signal outputs from the image signal generating device 61 and the writing timing.

The opening/closing judging means 62 for judging the opening or closing of the second main body 3 judges that the second main body 3 is closed. In consequence, the writing direction inverting means 63 sets the selection sequence of the gate lines 51 to shift from the gate line of the corner A side to the direction of C side. Therefore, the gate lines 51 for applying gate ON voltage are sequentially changed from corner A to direction of C among gate lines 51 by the gate driver 52, and at the same time, in the selected state of the gate line, the corresponding image data sent from the image signal generating device by the source driver 55 is changed over to the gradation voltage, which is applied in batch to all source lines 54, and it is applied to the pixel electrode 24 of each element on the selected gate line. By repeating this operation to the gate line of corner C, the image can be formed in a line sequence system from corner A to C, so that the image of the reflection mode can be visually recognized through the cover window 5 from the front light 6 side of the double-sided display type liquid crystal display device 10.

So far, an example of lighting of the front light 6 is explained, but it is the same when using external light (indicated by arrow Lo) by putting out the front light 6.

Therefore, a bright image can be displayed by using both the light of the front light 6 and external light (arrow Lo) at the same time.

Here, effects of transmission light (arrow Ld) when the second main body 3 is closed are studied. The reflection electrode 21 has a transmission window 22, and a part of the front light radiated light (arrow Li) reaching the reflection electrode 21 leaks to the opposite side through the transmission window 22 to be transmission light (arrow Ld). This transmission light (arrow Ld) is reflected by the surface of the first main body 1 to be scattered reflected light (arrow Ls). This scattered reflected light (arrow Ls) passes again through the double-sided display type liquid crystal display device 10, and when it leaks to the direction of the transparent cover 5, it induces color oozing, contrast decline or contour blurring. In this Embodiment, however, the quarter λ phase difference plate 40 is provided at the outside of the TFT array side polarizer 19, and the scattered reflected light (arrow Ls), after leaving the TFT array side polarizer 19, passes through the quarter λ phase difference plate 40 twice, and hence it becomes a straight polarized light orthogonal to the axis of polarization of the TFT array side polarizer 19 to be absorbed by the TFT array side polarizer 19. As a result, such adverse effects as mentioned above are suppressed.

Referring next to FIG. 2, FIG. 3 and FIG. 5, there is explained the operation of the double-sided display type liquid crystal display device and the foldable mobile phone using the same according to the Embodiment when its second main body 3 is opened. As shown in FIG. 2, when the second main body 3 is opened in the vertical direction, the opposite side (reverse side) of the front light 6 of the double-sided display type liquid crystal display device 10 is shown to the user side.

The foldable mobile phone according to the Embodiment has a front light lighting switch (not shown) for lighting the front light 6 when the opening/closing judging means 62 judges that the second main body 3 is open, and therefore when the opening/closing judging means 62 judges that the second main body 3 is open by detecting, for example, the angle of the hinge 4, the front light 6 is lit up automatically.

The light emitted from the light source 11 of the front light 6 spreads by diffusing and propagating through the front light light-conducting plate 12, and is radiated to the CF side polarizer 13 side by a reflection prism 12a provided in the light-conducting plate 12. The radiated light enters the CF side polarizer 13 to be a straight polarized light as indicated by arrow Li, and passes through the CF side phase difference plate 14, first substrate 15, liquid crystal 16, TFT array side transparent electrode 23 or the like, and reaches the reflection electrode 21, which is same as the operation in the case of closing of the second main body 3. Further, as indicated by arrow Ld, it passes through the transmission window 22 of the reflection electrode 21, and transmission light leaks to the reverse side. This transmission light passes through the TFT array side phase difference plate 18, TFT array side polarizer 19 or the like, and further passes through the quarter λ phase difference plate 40, to be visually recognized by the user at the reverse side of the double-sided display type liquid crystal display device 10 (transmission type display).

At this time, depending on the quantity of birefringence of the liquid crystal 16 layer determined by the electric field between the voltage applied to the pixel electrode 24 and the CF side transparent electrode 26, and on the quantity of birefringence of the CF side phase difference plate 14 and the TFT array side phase difference plate 18, the transmissivity of the transmission light indicated by arrow Ld when passing through the TFT array side polarizer 19 varies in a range of 0 to 1, and accordingly by setting the voltage applied to the pixel electrode 24, in every pixel, depending on the image, the image display by so-called transmission mode is realized. Generally, same as in the reflection mode, the quantity of birefringence of the TFT array side phase difference plate 18 is set so as to minimize also the transmissivity of the transmission light in the transmission mode in the TFT array side polarizer 19, at a voltage of minimum transmissivity of the reflected light in the reflection mode in the CF side polarizer 13.

At this time, in the case of a bright surrounding, ambient external light (arrow Lo) enters through the front light light-conducting plate 12, so that a bright image can be seen by utilizing both the external light (arrow Lo) and light (arrow L) of the light source 11 at the same time. Further, when the external light (arrow Lo) enters from the observer side, that is, from the second polarizer side (from the reverse side), the external light which enters the second polarizer, that is, the TFT array side polarizer 19 to be a straight polarized light passes through the transmission window 22 of the reflection electrode 21 and further passes through the liquid crystal layer to reach the first polarizer, that is, the color filter side polarizer 13. However, regardless of the driving state of the liquid crystal 16, since the light is almost completely absorbed or transmitted in this color filter side polarizer 13, almost no reflected light comes out. Hence, the contrast is not lowered.

At this time, though the reflection from the color filter side polarizer 13 which is the first polarizer is desired to be smaller because a high contrast is obtained, if there is almost no reflection, it is a level allowed as a picture quality in actual use. For example, to realize a contrast of 10 or more, preferably, at least more than 90% of the light reaching the color filter side polarizer 13 which is the first polarizer after passing through the transmission window 22 of the reflection electrode 21 and passing through the liquid crystal 16 layer should be adsorbed or transmitted in this color filter side polarizer 13 regardless of the driving state of the liquid crystal 16, while the reflected light should be within 10%.

FIG. 5 is a diagram explaining the writing direction of the display image when the second main body 3 is opened into each pixel of the double-sided display type liquid crystal display device, showing the display image of the double-sided display type liquid crystal display device 10 seen from the TFT array side glass substrate (second substrate) 17 side. As compared with the closed state of the second main body 3 shown in FIG. 4, the vertical direction is inverted, and corners A and C, and corners B and D are exchanged from each other.

The opening/closing judging means 62 judges that the second main body 3 is open by detecting, for example, the angle of the hinge 4. In consequence, the writing direction inverting means 63 inverts the selection sequence of the gate line 51 automatically from the sequence from gate at corner A side to C side direction to the sequence from corner C side gate to A side gate direction. Therefore, when selecting the gate line for applying the gate ON voltage among the gate lines 51 by the gate driver 52, the gate lines are selected sequentially from the corner C, not from the corner A, and in the selected state of the gate line simultaneously, each gradation voltage is applied in batch to all source lines 54, and the gate TFT 20 of the pixel at the intersection is turned on to apply the gradation voltage to the pixel electrode 24. By repeating this operation to the gate line of corner A, the image can be formed in a line sequence system from corner C to A, so that the image in the correct direction of the transmission mode can be visually recognized from the opposite side (reverse side) of the front light 6 of the double-sided display type liquid crystal display device 10. Accordingly, the user can visually recognize the image in the correct direction, if the second main body 3 is opened in the upper direction, without changing the holding position (while holding the first main body 1) from the closed state of the second main body 3.

As described above, the Embodiment comprises the liquid crystal material 16, first and second polarizing means 13 and 19 disposed on opposite sides of the liquid crystal material 16, transparent first and second electrodes 26 and 23 disposed between the liquid crystal material 16 and the first and second polarizing means 13 and 19, respectively, for controlling the quantity of birefringence by driving the liquid crystal material, semitransmission reflecting means 21 disposed between the liquid crystal material 16 and second polarizing means 19 for passing a part of the light passing through the liquid crystal material, and front light 6 disposed at the opposite side of the liquid crystal material 16 of the first polarizing means 13, in which the semitransmission reflecting means is the reflection electrode 21 disposed at the opposite side of the liquid crystal material 16 of the second electrode 23, and having the transmission window 22 for passing a part of the light passing through the first electrode 26, liquid crystal material 16, and second electrode 23. Therefore, the light reaching the reflection electrode 21 from the front light 6 side after passing through the first polarizing means 13, first electrode 26, liquid crystal material 16, and second electrode 23 partly passes through the transmission window 22 of the reflection electrode 21 to reach the second polarizing means 19, while the remainder is reflected by the reflection electrode 21 to reach the first polarizing means 13, so that the display image is visible from the first polarizing means 13 side and the second polarizing means 19 side. Further, in the reflection type display by the light reflected by the reflection electrode 21, since the second substrate 17 is not present between the reflecting means (reflection electrode 21) and the first polarizing means 13, the optical path is shorter as compared with the case of presence of the second substrate 17, so that the parallax in the display image is reduced.

Though the above explanation is made in the case where the second main body 3 opens and closes in the vertical direction, even when opening and closing in the lateral direction, similar effects are obtained by inverting the writing direction of display image data to the lateral direction into each pixel of the double-sided display type liquid crystal display device by the writing direction inverting means 63.

The reflection electrode 21 is usually made of a conductive metal such as aluminum or silver, but it might be also made of a transparent electrode in a structure having an insulation film or metal film for reflecting the light at a high reflectivity by closely and optically contacting with the opposite side of the liquid crystal 16.

In the foregoing explanation, the first electrode and first polarizer at the front light side of the liquid crystal 16 layer are at the color filter side, and the second electrode and second polarizer are at the TFT array side, and the reflection electrode 21 having the transmission window 22 is provided at the opposite side of the liquid crystal 16 of the second electrode, that is, the TFT array side transparent electrode 23, but to the contrary, the same effects are obtained if the first electrode and first polarizer are at the TFT array side, the second electrode and second polarizer are at the color filter (CF) side, and the reflection electrode 21 having the transmission window 22 is provided at the opposite side of the liquid crystal 16 of the CF side transparent electrode 26.

In the foldable mobile phone of the Embodiment described above, in the closed state of the second main body 3, the image (the image viewed from the front light 6 side of the double-sided display type liquid crystal display device 10) displayed in the double-sided display type liquid crystal display device 10 includes, when receiving, the sender's name, sender's portrait, mail message, i-mode (registered trademark) reception area map, home page (HP), and others, and, while waiting, the waiting screen of the mobile phone shows, for example, the antenna showing the intensity of radio wave, battery level, calendar, time, illustration, portrait, game, i-mode reception area map, HP, decorative pattern, and decorative illumination.

In the open state of the second main body 3, the image (the image viewed from the TFT array side polarizer 19 side of the double-sided display type liquid crystal display device 10) displayed in the double-sided display type liquid crystal display device 10 includes, when receiving, the sender's name, sender's portrait, mail message, and others, and, while waiting, the waiting screen of the mobile phone shows, for example, the antenna showing the intensity of radio wave, battery level, calendar, time, illustration, portrait, game, and mail message writing screen.

In the foregoing Embodiment, the semitransparent reflecting means for passing a part of the light passing through the first substrate 15 and liquid crystal 16 is the reflection electrode 21 formed at the liquid crystal layer side of the second substrate 17, and has the transmission window 22 for passing a part of the light passing through the first substrate 15, first electrode 26, liquid crystal 16 and second electrode 23. The present invention is not, however, limited to this, and instead of the reflection electrode 21 having the transmission window 22, the reflector having the transmission window might be formed, for example, by using an aluminum vapor deposition mirror film having multiple fine transmission windows, and this reflector having transmission windows might be adhered between the second glass substrate, that is, the TFT array side glass substrate 17 and the TFT array side phase difference plate 18.

Further, as described in Prior Art 2, for example, using a film of half mirror or magic mirror with aluminum formed on a thin transparent film base by vapor deposition, the film base might be adhered to the quarter λ phase difference plate 40 of the TFT array side polarizer 19.

Embodiment 2

Figure 6:
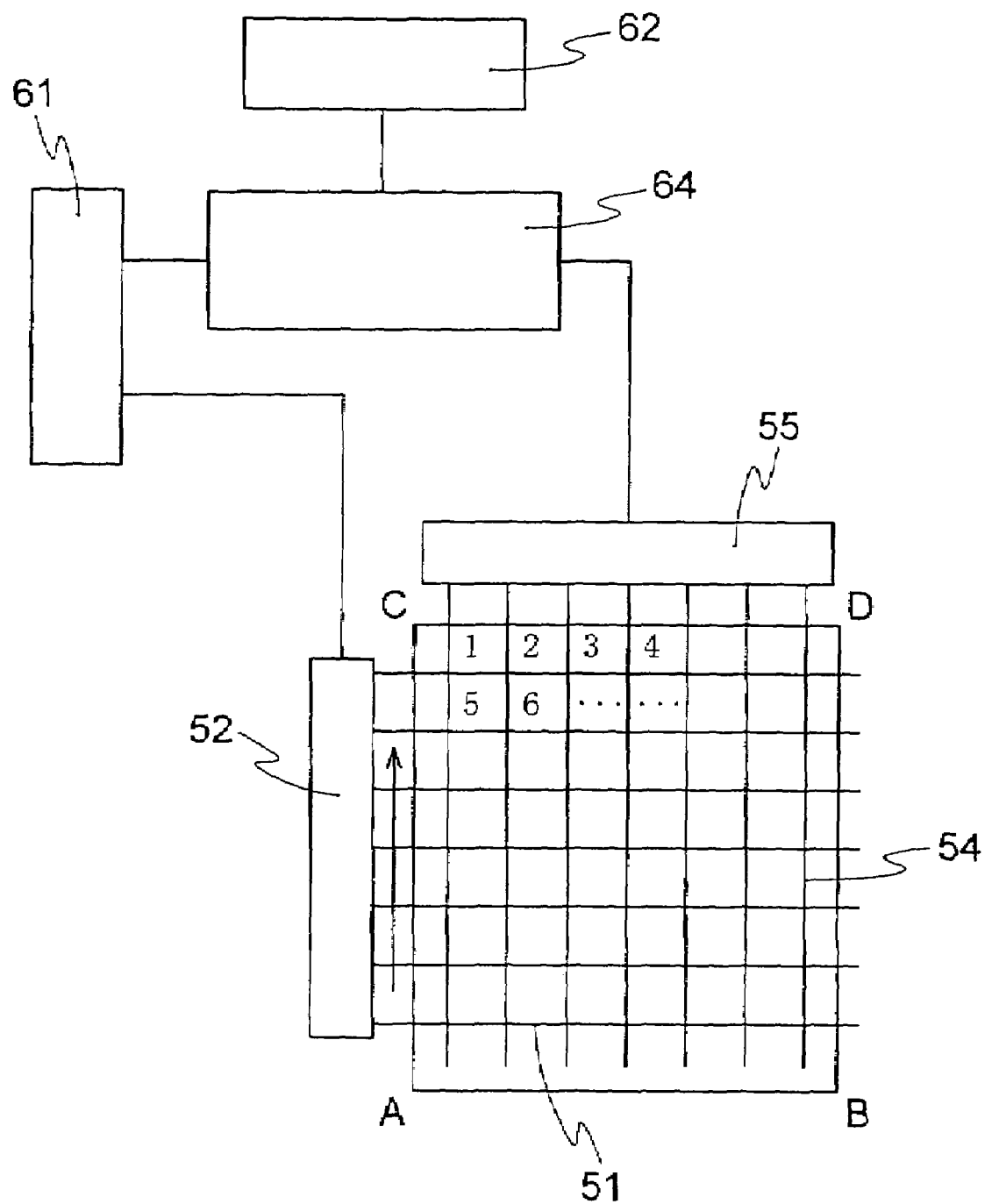
FIG. 6 is a diagram explaining a double-sided display type liquid crystal display device and an information appliance using the same according to Embodiment 2 of the present invention.

FIG. 6 is a diagram explaining a double-sided display type liquid crystal display device and an information appliance using the same according to Embodiment 2 of the present invention, and more specifically it is a diagram explaining shuffling of data of display image. Other configuration is same as in Embodiment 1.

In FIG. 6, reference numeral 64 denotes data converting means for converting the data of display image by shuffling upside down corresponding to the opening/closing position of the second main body 3, in collaboration with the opening/closing judging device 62. The data converting means 64 is specifically composed of, for example, frame memory and CPU, and the image signal (image data) generated in an image signal generating device 61 is once stored, and converted into data by inverting the display image upside down, and sent to a source driver 55.

In a foldable mobile phone of the Embodiment having such configuration, the sequence of gate selection of a double-sided display type liquid crystal display device 10 is the same regardless of opening or closing of a second main body 3, and corresponding to the open or closed state of the second main body 3 detected by an opening/closing judging device 62, the image data to be displayed is converted by shuffling in the vertical direction automatically by the data converting means 64, and sent into the source driver 55 of the double-sided display type liquid crystal display device 10. Therefore, the user can view the image in correct direction if the second main body 3 is opened in the upper direction without having to change the holding position in the closed state of the second main body (while holding the first main body 1).

In the foregoing Embodiments, the second main body is opened and closed in the vertical direction, but same effects are obtained if opened and closed in the lateral direction by converting the data by inverting in the lateral direction by the data converting means 64.

Embodiment 3

Figure 7:
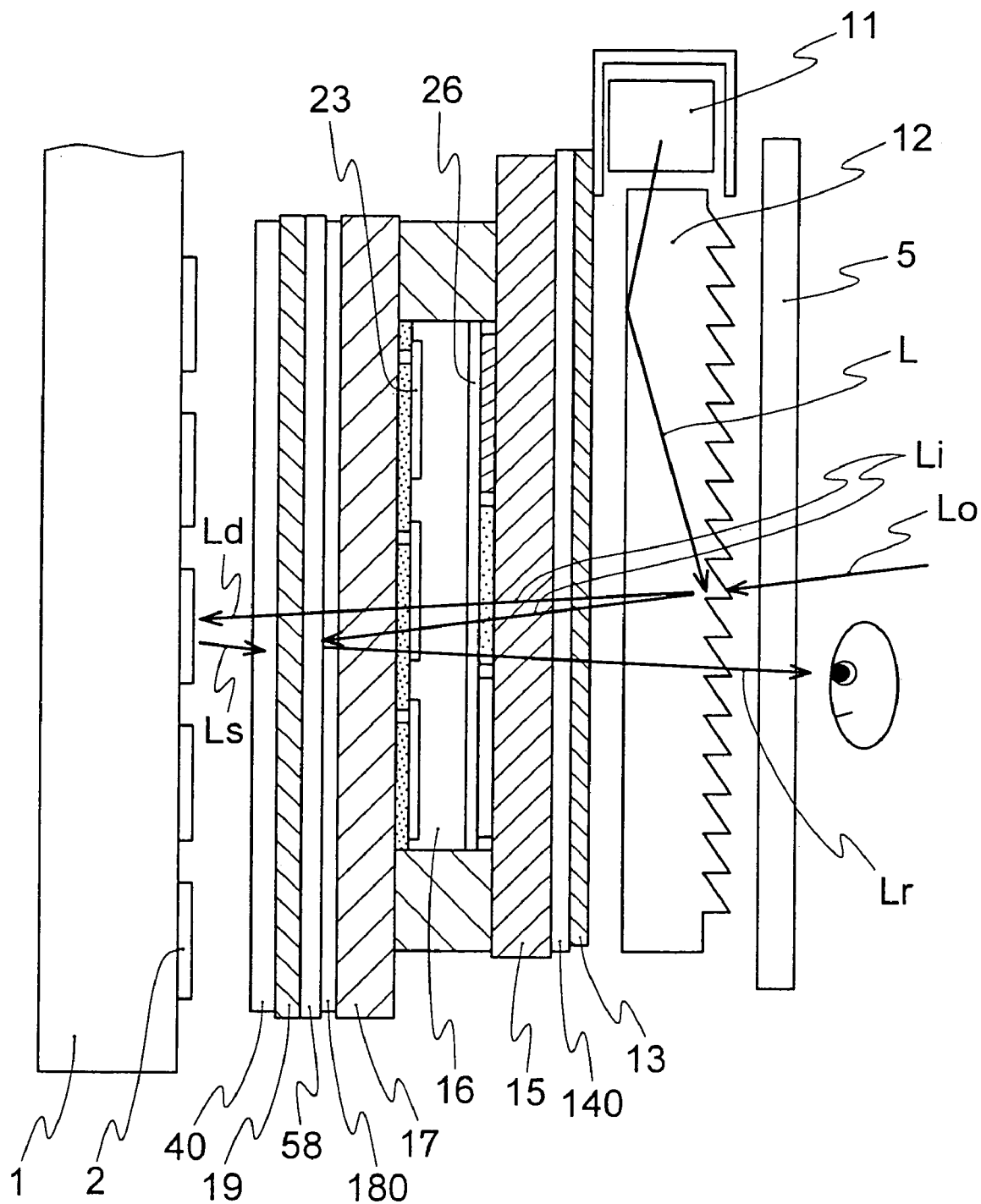
FIG. 7 is a diagram explaining a double-sided display type liquid crystal display device and an information appliance using the same according to Embodiment 3 of the present invention.
Figure 8:
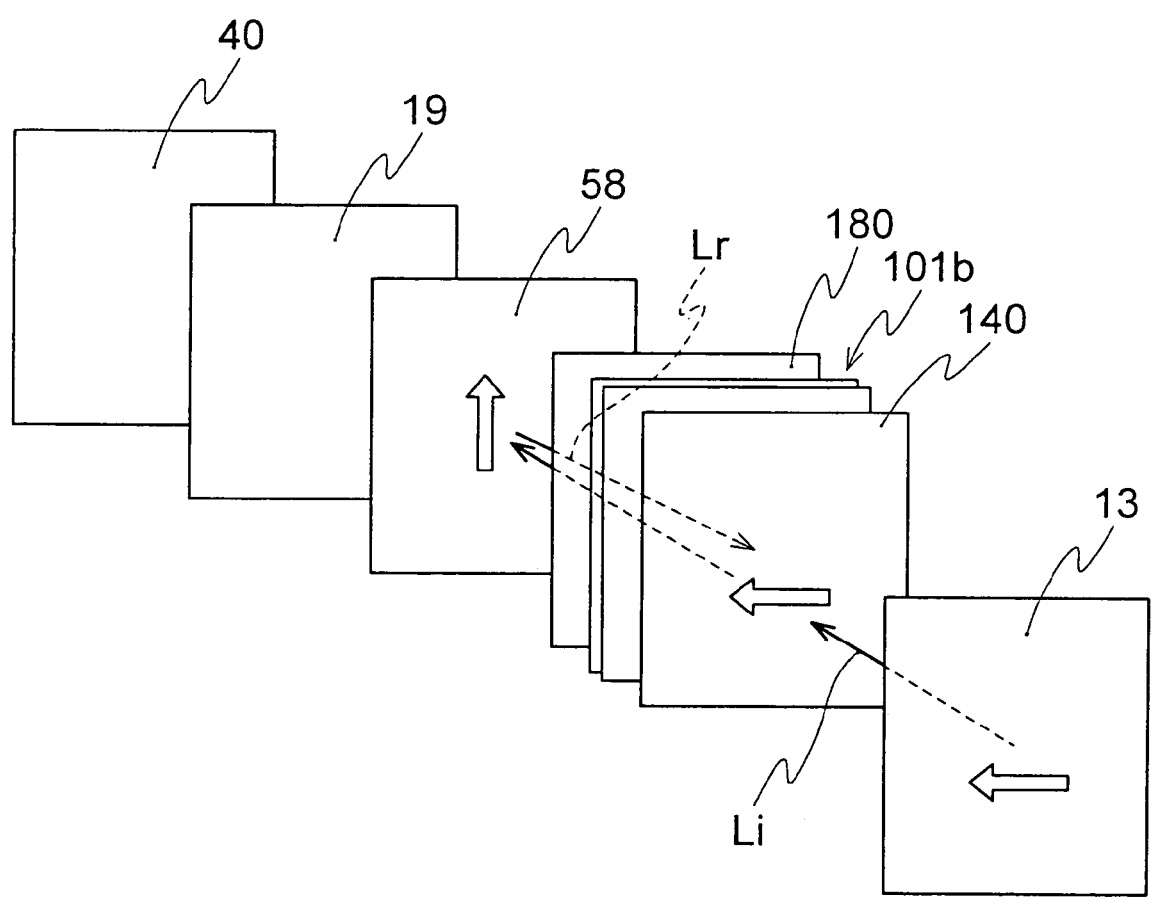
FIG. 8 is a diagram explaining the double-sided display type liquid crystal display device and the information appliance using the same according to Embodiment 3 of the present invention.
Figure 9:
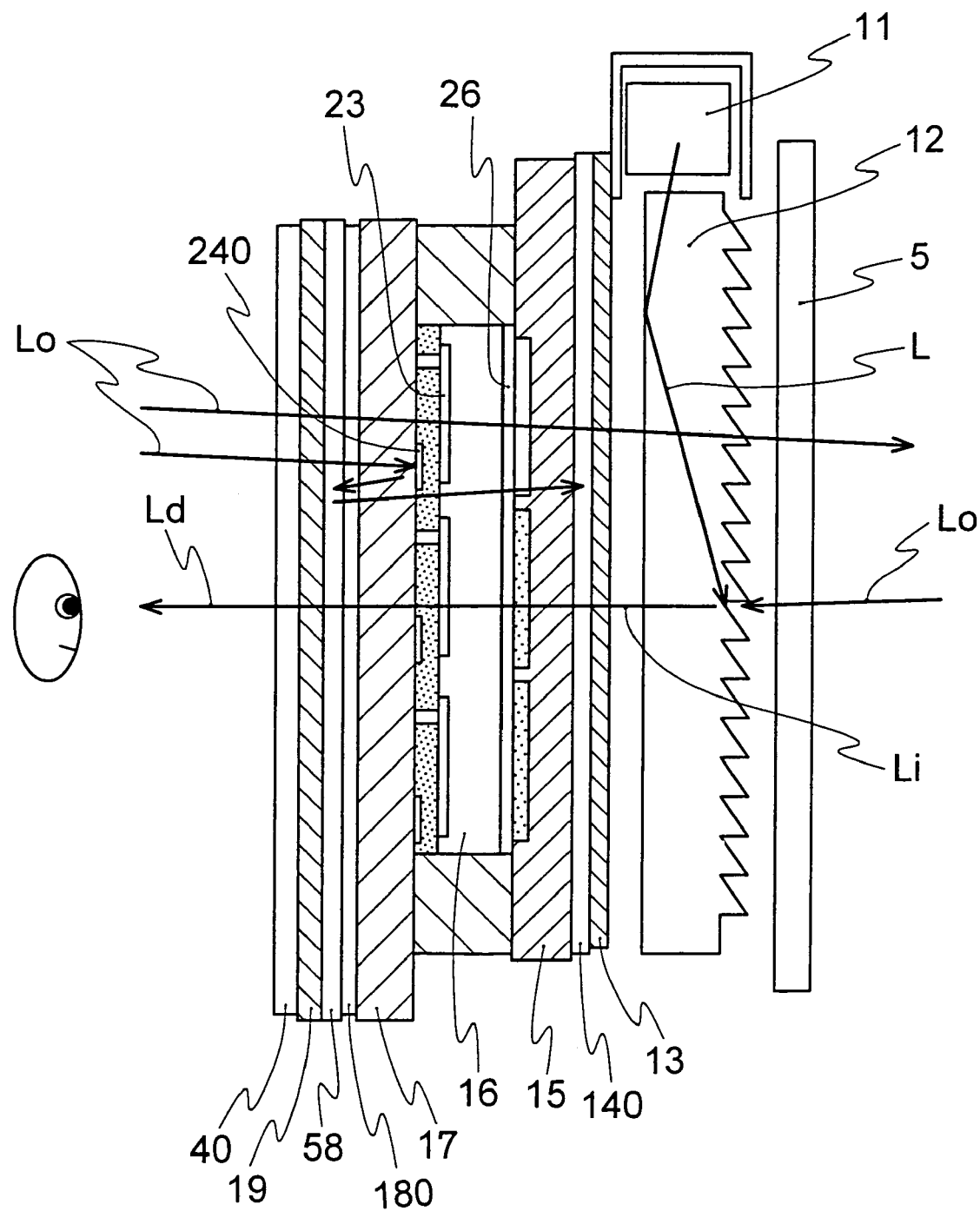
FIG. 9 is a diagram explaining the double-sided display type liquid crystal display device and the information appliance using the same according to Embodiment 3 of the present invention.
Figure 10:
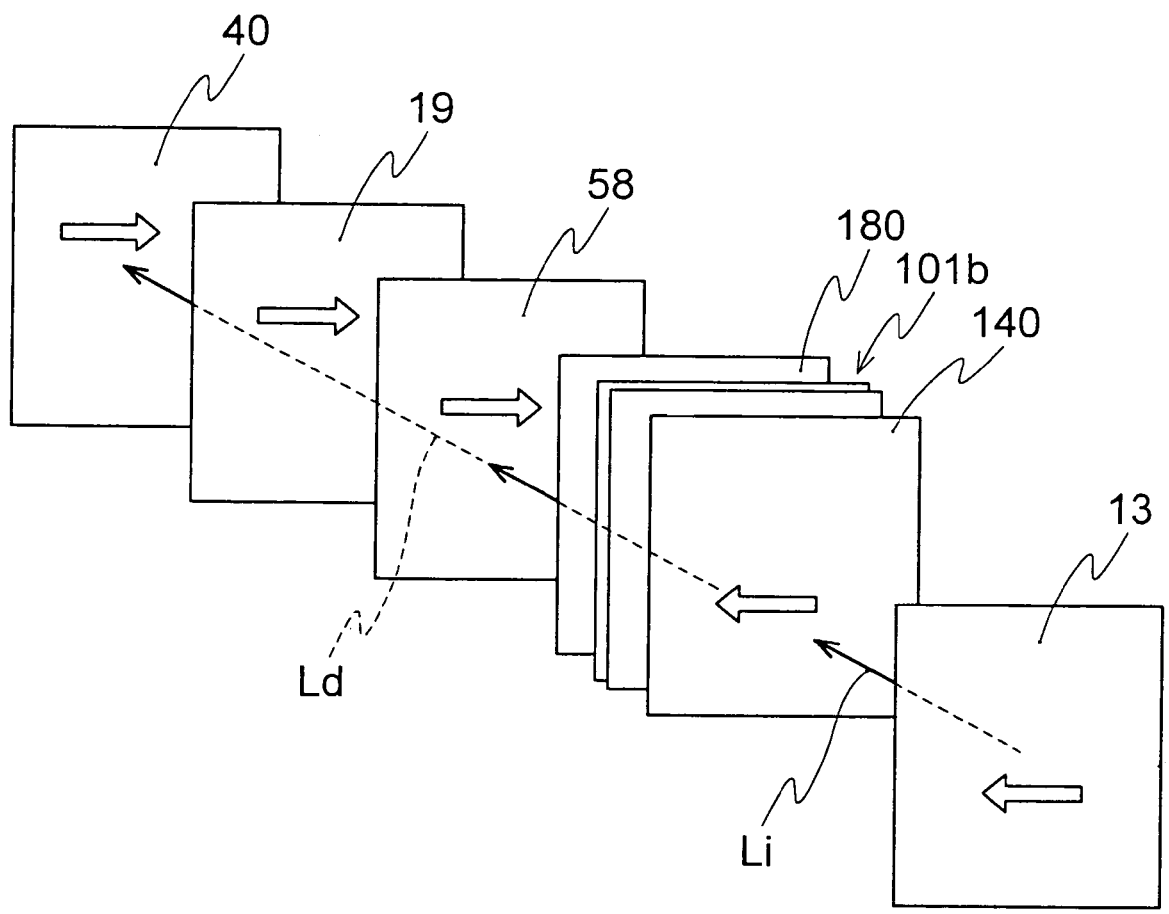
FIG. 10 is a diagram explaining the double-sided display type liquid crystal display device and the information appliance using the same according to Embodiment 3 of the present invention.

FIG. 7 to FIG. 10 are diagrams explaining a double-sided display type liquid crystal display device and an information appliance using the same according to Embodiment 3 of the present invention, and more specifically FIG. 7 is a magnified sectional view of essential parts of a foldable mobile phone as an information appliance in a folded state (second main body is closed), FIG. 8 is an explanatory diagram of an example of the direction of polarization for each light shown in FIG. 7, FIG. 9 is a magnified sectional view of essential parts of the second main body in an opened state, and FIG. 10 is an explanatory diagram of an example of the direction of polarization for each light shown in FIG. 9.

In the foregoing Embodiment 1, the semitransmission reflecting means which passes a part of the light passing through the liquid crystal 16 is composed of the reflection electrode 23 having the transmission window 22, but in this Embodiment it is composed of a reflection polarizer for reflecting the light having a specified polarizing characteristic, and almost passing other light (reflecting the light straightly polarized in a specified direction and passing the light straightly polarized in a direction perpendicular to the specified direction).

In FIG. 7 to FIG. 10, reference numeral 58 denotes a TFT array side reflection polarizer disposed between a liquid crystal 16 and second polarizing means (TFT array side polarizer 19) for reflecting the light straightly polarized in a specified direction and passing the light straightly polarized in a direction perpendicular to the specified direction, and in this Embodiment it is disposed between a TFT array side glass substrate 17 and TFT array side polarizer 19. The TFT array side reflection polarizer 58 is composed of, for example, DBEF (Double Brightness Enhanced Film, a trade name of SUMITOMO 3M LIMITED). Reference numeral 204 denotes a metal wiring for applying a voltage to a second electrode (TFT array side transparent electrode 23). Reference numeral 180 denotes a first quarter λ phase difference plate, and it is disposed between the metal wiring 204 and reflection polarizer 58 in this Embodiment. Reference numeral 140 denotes a third quarter λ phase difference plate, and it is disposed between a color filer (CF) side glass substrate 15 and first polarizing means (CF side polarizer 13) in this Embodiment. Reference numeral 101b denotes a liquid crystal display panel having a liquid crystal 16 and first and second electrodes 26 and 23 for driving the liquid crystal 16, and in this Embodiment the first and second electrodes 26 and 23 are transparent electrodes not having reflection function, and this is a total transmission type liquid crystal display panel for passing all light entering the liquid crystal 16.

In the foregoing Embodiment 1, a pixel electrode is composed of reflection electrode 21 and TFT array side transparent electrode 23, but in this Embodiment a pixel electrode is composed of TFT array side transparent electrode 23, and pixel electrodes are arranged in an array on the TFT array side glass substrate 17.

A foldable mobile phone according to the Embodiment is same as in Embodiment 1, except for the structure of double-sided display type liquid crystal display device 10. That is, it comprises a first main body 1 having various function switches 2 including alphanumeric input switches, and a second main body 3 having a double-sided display type liquid crystal display device 10 visibly displaying various kinds of information as display means and being coupled to the first main body 1 by a hinge 4 in an opening and closing manner. Openings (windows) are provided at both outer side coming to the outside and inner side coming to the inside when the second main body 3 is closed, and a transparent cover 5 is provided at the outer side opening (the window provided at the outer side) so as to dispose the front light side surface of the double-sided display type liquid crystal display device 10, and the surface of the second polarizing means side of the double-sided display type liquid crystal display device 10 is provided at the inner side opening (the window provided at the inner side), thereby composing a display unit.

Hereinafter, mainly, the different points from Embodiment 1 are described. The double-sided display type liquid crystal display device according to the Embodiment comprises a front light 6 composed of a light source 11 and a front light guide 12, a CF side glass substrate 15 having a CF 25 and a CF side transparent electrode 26, a TFT array side glass substrate 17, a liquid crystal layer 16 of, for example, TN liquid crystal held between these two glass substrates 15 and 17, and a TFT array side transparent electrode 23 to which a voltage is applied through a gate TFT 20, and further a first quarter λ phase difference plate (TFT array side quarter λ phase difference plate 180), a reflection polarizer 58, a second polarizer (TFT array side polarizer 19), and second quarter λ phase difference plate 40 are sequentially adhered on the TFT array side glass substrate 17, and a third quarter λ phase difference plate (CF side quarter λ phase difference plate 140) and a first polarizer (CF side polarizer 13) are sequentially adhered on the CF side glass substrate 15.

Referring then to FIG. 7 to FIG. 10, the operation of the double-sided display type liquid crystal display device according to the Embodiment is explained on the basis of an example of lighting of the front light 6.

As indicated by arrow L, the light emitted from the light source 11 spreads by diffusing and propagating through the light-conducting plate 12, and is radiated by the reflection prism 12a provided in the light-conducting plate 12 to the CF side polarizer 13 side as indicated by arrow Li. The radiated light is straightly polarized by the CF side polarizer 13 (in FIG. 8 and FIG. 10, a straightly polarized light in the lateral direction), and passes through the CF side quarter λ phase difference plate 140, and enters the total transmission type liquid crystal display panel 101b. Further, passing through the TFT array side quarter λ phase difference plate 180, it reaches the TFT array side polarization reflector 58.

In the total transmission type liquid crystal display panel 101b, when voltage is not applied between the CF side transmission electrode 26 and TFT array side transparent electrode 23, the direction of polarization is rotated by 180 degrees by the quantity of birefringence (retardation) of the liquid crystal 16 layer and quarter λ phase difference plates 140, 180, and the light is straightly polarized in the lateral direction as shown in FIG. 10 to reach the TFT array side polarization reflector 58.

When voltage is applied, the quantity of birefringence of the liquid crystal layer 16 approaches 0, and the direction of polarization is rotated by 90 degrees by the quantity of birefringence of the liquid crystal 16 layer and quarter λ phase difference plates 140, 180, and the straightly polarized light reaches the TFT array side polarization reflector 58.

Herein, in the TFT array side polarization reflector 58, the light straightly polarized in the specified direction, that is, in the longitudinal direction is reflected to be a reflected light, and as indicated by arrow Lr in FIG. 7 and FIG. 8, it passes again through the TFT array side quarter λ phase difference plate 180, total transmission type liquid crystal display panel 101b, CF side quarter λ phase difference plate 140, CF side polarizer 13, front light 6, transparent cover 5 or the like, and is visually recognized by the user at the front light 6 side of the double-sided display type liquid crystal display device 10 (reflection type display).

Further, in the TFT array side polarization reflector 58, the light straightly polarized to a direction perpendicular to the specified direction, that is, to the lateral direction passes therethrough, and as indicated by arrow Ld in FIG. 9 and FIG. 10, it passes again through the TFT array side polarizer 19, second quarter λ phase difference plate 40 or the like, and is visually recognized by the user at the second polarizer (TFT array side polarizer 19) of the double-sided display type liquid crystal display device 10 (transmission type display).

At this time, as shown in FIG. 8 and FIG. 10, by the quantity of birefringence of the liquid crystal 16 layer determined by the voltage applied to the TFT array side transparent electrode 23, and the quantity of birefringence of the quarter λ phase difference plates 140, 180, the reflectivity of the reflected light (arrow Lr) reflected by the TFT array side reflection polarizer 58 varies from 0 to 1, and at the same time, the transmissivity of the transmission light (arrow Ld) varies from 1 to 0. In result, the image can be displayed by setting the voltage applied to the TFT array side transparent electrode 23 in every pixel 24 depending on the image.

Usually, as shown in FIG. 9, what is important is the contrast of black and white reversal by the liquid crystal 16 of the transmission light (arrow Ld) seen from the inside surface in the open state of the second main body 3 of the foldable mobile phone, and therefore it is set to heighten the transmissivity of the transmission light (arrow Ld) in the state of low electric field determined by the TFT array side transparent electrode 23, and lower the transmissivity to approach 0 when the electric field becomes higher and the TN liquid crystal molecules are aligned perpendicularly to the glass substrates 15 and 17.

First, referring to FIG. 7, the display from the first polarizing means 13 is explained. By the quantity of birefringence of the liquid crystal 16 layer determined by the voltage applied to the TFT array side transparent electrode 23, when setting the reflectivity of the reflected light (arrow Lr) reflected by the TFT array side reflection polarizer 58 at 1, white color is displayed to the user from the first polarizer 13 side (front light 6 side) shown in FIG. 7. Thus, unlike Embodiment 1, since there is no light missing loss through the transmission window 22, a higher reflection efficiency is obtained as compared with the case of using the reflection electrode 21 having a partial transmission portion (transmission window 22) as semitransmission reflecting means.

At this time, a further bright reflection image is realized when the reflectivity is higher when the reflectivity of the reflected light (arrow Lr) reflected by the TFT array side reflection polarizer 58 is set at 1. However, even if there is a slight absorption, it is no problem in practical use. For example, when the reflectivity is set at 1, if the light enters the TFT array side reflection polarizer 58 from the liquid crystal 16 layer, assuming the absorption rate to be 10% and reflectivity to be 90%, the brightness is lowered only by 10%, and it is no problem.

By the quantity of birefringence of the liquid crystal 16 layer determined by the voltage applied to the TFT array side transparent electrode 23, when setting the reflectivity of the reflected light Lr reflected by the TFT array side reflection polarizer 58 at 0, the transmissivity becomes 1, and the front light radiated light (arrow Li) passes through the TFT array side reflection polarizer 58 to be transmission light (arrow Ld). This transmission light (arrow Ld) passes through the TFT array side polarizer 19, and further passes the second quarter λ phase difference plate 40, thereby illuminating the surface of the main body 1. This transmission light (arrow Ld) is reflected by the surface of the first main body 1, and becomes a scattered reflected light (arrow Ls). When this scattered reflected light (arrow Ls) passes again through the double-sided display type liquid crystal display device 10, and leaks in the direction of the transparent cover 5 at the front light 6 side to be visually recognized, it induces color oozing, contrast decline or contour blurring. In this Embodiment, however, the quarter λ phase difference plate 40 is provided at the outside of the TFT array side polarizer 19, and the scattered reflected light (arrow Ls), after leaving the TFT array side polarizer 19, passes through the quarter λ phase difference plate 40 twice, and hence it becomes a straight polarized light orthogonal to the axis of polarization of the TFT array side polarizer 19, and is hence absorbed by the TFT array side polarizer 19 without passing therethrough. In result, a tight black color is displayed to the user from the first polarizing means 13 side (front light 6 side) shown in FIG. 7.

This operation is exactly the same when external light (arrow Lo) enters by passing through the front light 6, and hence in an environment of relatively less bright light, the external light and front light can be used at the same time to visually recognize a bright and clear reflected image.

Next, referring to FIG. 9, the display from the second polarizing means 19 side when the second main body 3 is opened is explained. By the quantity of birefringence of the liquid crystal 16 layer determined by the voltage applied to the TFT array side transparent electrode 23, when setting the transmissivity of the transmission light (arrow Ld) passing through the TFT array side reflection polarizer 58 at 1, white color is displayed, and when setting at 0, black color is displayed. This operation is exactly the same both in the case where the light radiated by lighting the front light 6 enters and in the case where the external light (arrow Lo) enters after passing through the front light 6, and therefore in an environment of relatively less bright light, the external light and front light can be used at the same time to visually recognize a bright and clear reflected image.

At this time, the external light (arrow Lo) illuminating the double-sided display type liquid crystal display device from the user side (the second polarizing means 19 side) is a factor of lowering the contrast of the display image, but since the TFT array side polarizer 19 absorbs the straight polarized light in the direction of reflection of the TFT array side reflection polarizer 58, there is not happened the case where the external light (arrow Lo) entering the double-sided display type liquid crystal display device from the second polarizing means 19 side is reflected by the TFT array side reflection polarizer 58 and hence reaches up to the eyes of the user at the second polarizing means 19 side.

Of the external light Lo, the light passing through the second polarizer 19 and reflection polarizer 58 and passing through the liquid crystal cell is mostly absorbed or transmitted by the first polarizer 13 regardless of the driving state of the liquid crystal 16, and is not reflected. Therefore, in a bright environment with external light Lo, the contrast of the transmission image is high.

Of the external light (arrow Lo) illuminating the double-sided display type liquid crystal display device from the user side (the second polarizing means 19 side), the light passing through the TFT array side polarizer 19 and TFT array side reflection polarizer 58 is reflected by the metal wiring 204 or TFT formed in the TFT array side glass substrate 17, and is a factor to lower the contrast. But in this Embodiment, since a first quarter λ phase difference plate (TFT array side quarter λ phase difference plate 180) is provided between the TFT array side glass substrate 17 and TFT array side reflection polarizer 58, the light passes through the first quarter λ phase difference plate in two reciprocal strokes so that the direction of polarization is rotated by 90 degrees, thereby the reflected light from the metal wiring 204 and TFT cannot pass through the reflection polarizer 58 again. Therefore, the reflected light from the metal wiring 204 or TFT does not reach up to the eyes of the user at the second polarizing means 19 side, thereby preventing lowering of contrast by reflected light from the metal wiring 204 or TFT.

In this Embodiment, a third quarter λ phase difference plate 140 is disposed between the liquid crystal 16 and first polarizing means 13, and same as in the case of the first quarter λ phase difference plate 180, for the user from the front light 6 side, interlayer reflection or reflected light from the wiring member in the pixel boundary can be cut off, and lowering of contrast by reflected light can be prevented.

In the foregoing Embodiment 1, similarly, of the external light illuminating the double-side display type liquid crystal display device from the second polarizing means 19 side, if the light passing through the TFT array side polarizer 19 is reflected by the metal wiring 204, TFT, reflection electrode 21 formed on the TFT array side glass substrate 17, it is a cause of lowering the contrast when observing from the second polarizing means 19 side. But, the Embodiment includes the TFT array side phase difference plate 180 disposed between the TFT array side glass substrate 17 and second polarizing means, and by setting the quantity of birefringence of this phase difference plate 180 at about quarter λ, the direction of polarization is rotated since the light passes through the phase difference plate 180. Thus, the reflected light from the metal wiring 204, TFT and reflection electrode 21 cannot pass through the TFT array side polarizer 19 again. Therefore, the reflected light from the metal wiring 204, TFT and reflection electrode 21 does not reach up to the eyes of the user at the second polarizing means 19 side, thereby preventing lowering of contrast by reflected light from the metal wiring 204, TFT and reflection electrode 21.

As explained also in the foregoing Embodiment 1, the relation between the applied voltage of the liquid crystal 16 layer and brightness is inverted between when the foldable mobile phone is seen from the inside of the folded state and when seen from the outside, and therefore the gradation of the display image data must be inverted beforehand depending on whether in opened state or in closed state. At the same time, the data conversion is necessary to invert the image data upside down in the case of vertical folding or invert the image data right and left in the case of lateral folding. Specifically, in FIG. 6 relating to Embodiment 2, the data converting means 64 incorporates a function of shuffling image data and converting the gradation at the same time, and by detecting the opening or closing of the information appliance, the image data is shuffled and the gradation is converted automatically. Moreover, by disposing an external changeover switch, the user can change over.

In the foregoing description, the first electrode is the CF side transparent electrode 26 and the second electrode is the TFT array side transparent electrode 23, but same effects are obtained, to the contrary, when the first electrode is the TFT array side transparent electrode 23 and the second electrode is the CF side transparent electrode 26.

Similarly, in the foregoing description, the first electrode and first polarizer at the front light side of the liquid crystal 16 layer are at the color filter side, and the second electrode and second polarizer are at the TFT array side, but same effects are obtained, to the contrary, when the first electrode and first polarizer are at the TFT array side, and the second electrode and second polarizer are at the color filter (CF) side.

Embodiment 4

Figure 11:
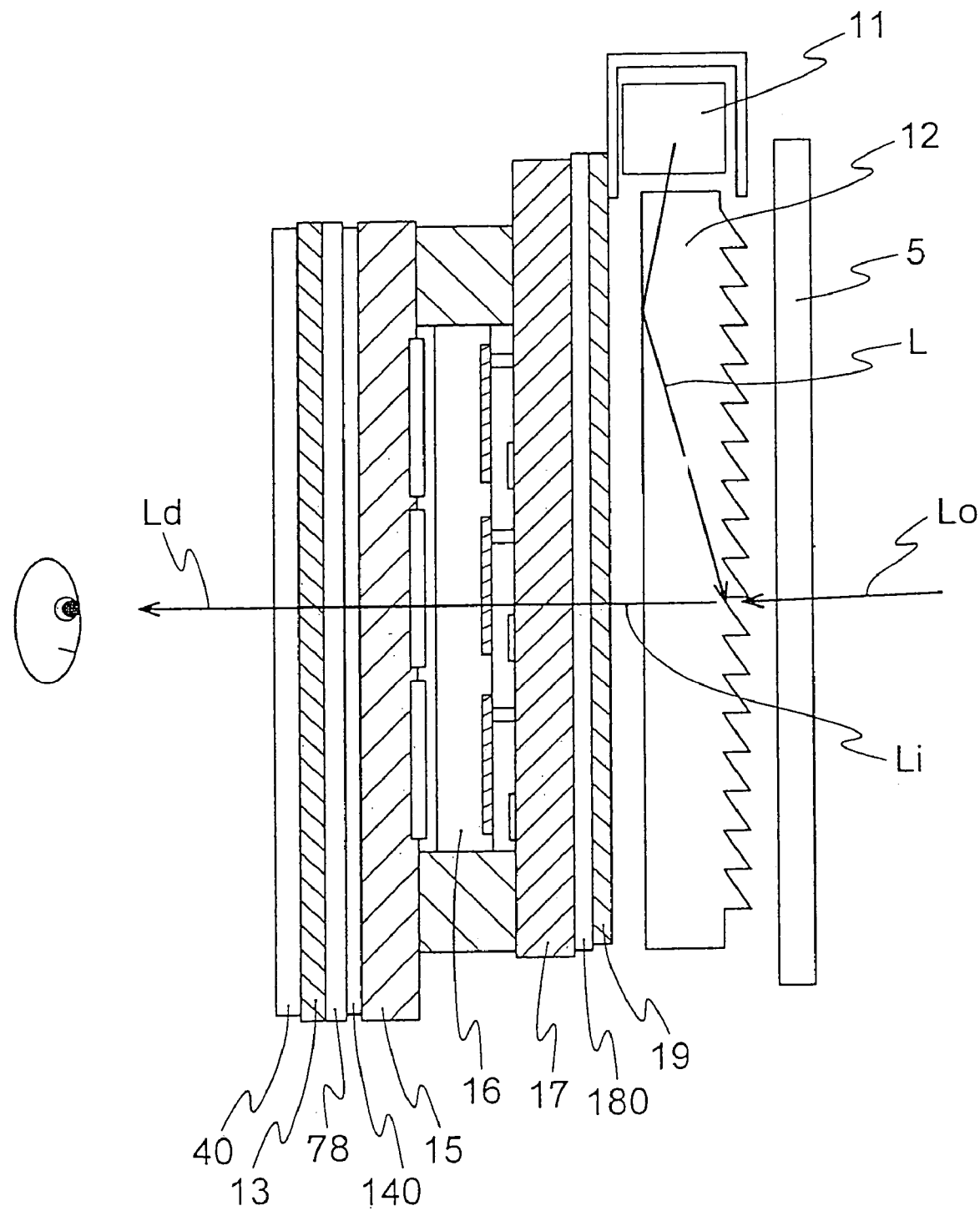
FIG. 11 is a diagram explaining a double-sided display type liquid crystal display device and an information appliance using the same according to Embodiment 4 of the present invention.
Figure 12A:
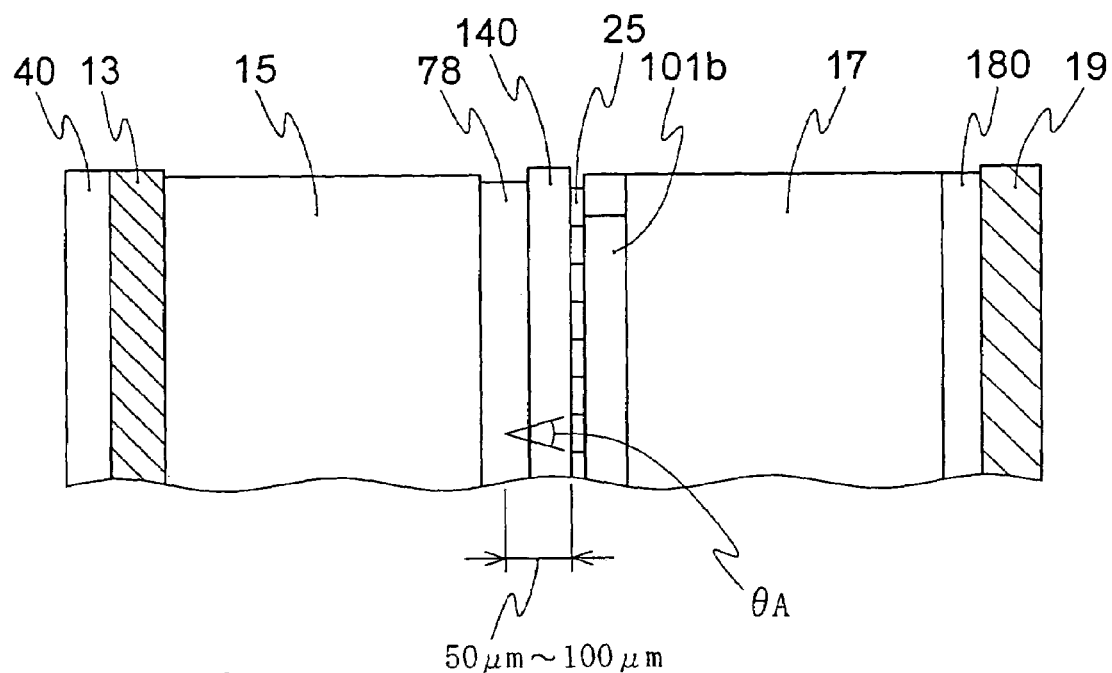
FIGS. 12(a) and 12(b) are diagrams explaining the double-sided liquid crystal display device and the information appliance using the same according to Embodiment 4 of the present invention.
Figure 12B:
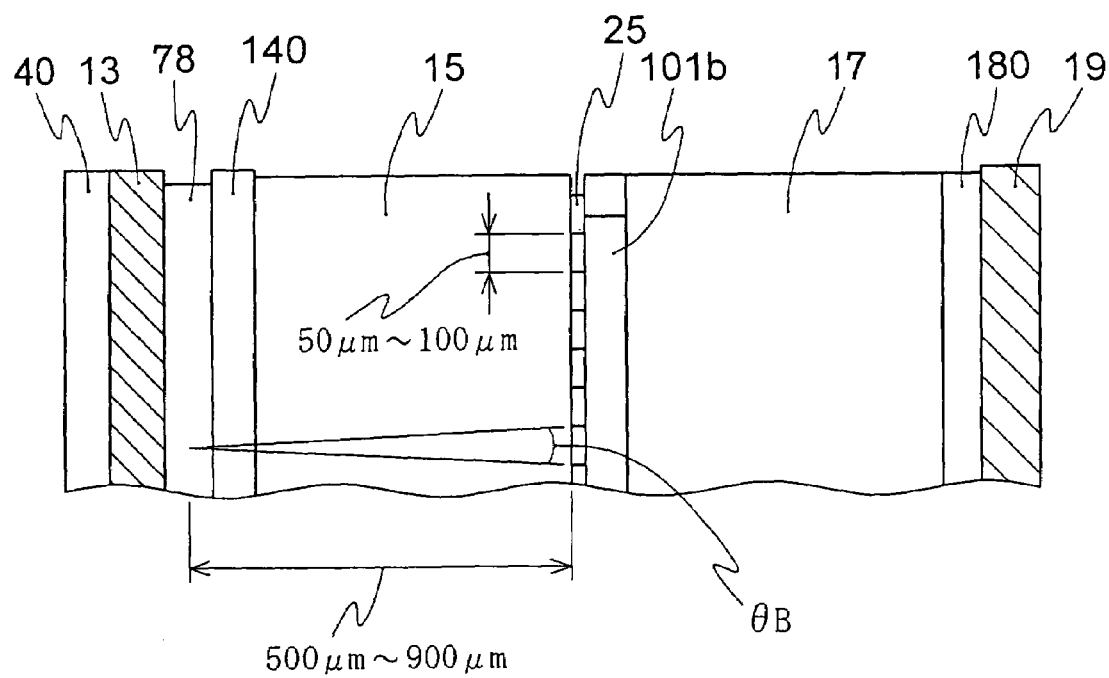

FIG. 11 and FIGS. 12(a) and 12(b) are diagrams explaining a double-sided liquid crystal display device and an information appliance using the same according to Embodiment 4 of the present invention, and more specifically FIG. 11 is a sectional view of essential parts of the double-sided liquid crystal display device, and FIGS. 12 (a), and 12 (b) are partially magnified sectional views of the double-sided liquid crystal display device in another example and in FIG. 11. FIG. 12(a), FIG. 12(b) are drawn in a dimensional ratio close to the actual aspect ratio of width and thickness.

In FIG. 11 and FIGS. 12 (a) and 12 (b), reference numeral 78 denotes a CF side reflection polarizer disposed between the liquid crystal 16 and second polarizing means (CF side polarizer 13), for reflecting the straight light polarized in a specified direction, and transmitting the straight light polarized in a direction perpendicular thereto.

In the foregoing Embodiment 3, the first polarizing means is the CF side polarizer 13, the second polarizing means is the TFT array side polarizer 19, the first electrode is the CF side transparent electrode 26, the second electrode is the TFT array side transparent electrode 23, the first substrate is the CF side glass substrate 15, the second substrate is the TFT array side glass substrate 17, and the TFT array side reflection polarizer 58 is disposed between the second substrate (TFT array side glass substrate 17) and second polarizing means (TFT array side polarizer 19), whereas in this Embodiment, the first polarizing means is the TFT array side polarizer 19, the second polarizing means is the CF side polarizer 13, the first electrode is the TFT array side transparent electrode 23, the second electrode is the CF side transparent electrode 26, the first substrate is the TFT array side glass substrate 17, the second substrate is the CF array side glass substrate 15, and the CF side reflection polarizer 78 is disposed between the second substrate (CF glass substrate 17) and second electrode (the CF side transparent electrode 26).

The other configuration of the double-sided display type liquid crystal display device of the Embodiment and the information appliance using the same is same as in Embodiment 3.

Mainly different points from Embodiment 3 are explained below. The double-sided display type liquid crystal display device according to the Embodiment comprises a front light 6 composed of a light source 11 and a front light light-conducting plate 12, a TFT array side glass substrate 17, a CF side glass substrate 15, and a liquid crystal 16 layer of, for example, TN liquid crystal held between these two substrates 17 and 15. A TFT array side transparent electrode 23 (first electrode) to which a voltage is applied through a gate TFT 20 is provided at the inner side (liquid crystal 16 layer side) of the TFT array side glass substrate 17 (first substrate), and a first quarter λ phase difference plate (TFT array side quarter λ phase difference plate 180) and a TFT array side polarizer 19 as first polarizing means are sequentially adhered to the outer side (the opposite side of the liquid crystal 16 layer) of the TFT array side glass substrate 17. At the inner side of the CF side glass substrate 15 (second substrate), a reflection polarizer 78 and a third quarter λ phase difference plate (CF side quarter λ phase difference plate 140) are sequentially adhered, and further a CF 25 and a CF side transparent electrode 26 (second electrode) are formed, and at the outer side of the CF side glass substrate 15, a CF side polarizer 13 is adhered, and at the further outer side, a quarter λ phase difference plate 40 is adhered.

The detail of operation of the double-sided display type liquid crystal display device of the Embodiment is explained below by referring to a case of lighting of the front light 6.

The light (arrow L) emitted from the light source 11 spreads by diffusing and propagating through the light-conducting plate 12, and is radiated by a reflection prism 12a provided in the light-conducting plate 12 to the TFT array side polarizer 19 side. The radiated light (arrow Li) is straightly polarized by the TFT array side polarizer 19, and passes through the TFT array side quarter λ phase difference plate 180, TFT array side glass substrate 17, TFT array side transparent electrode 23, liquid crystal 16 layer, CF side transparent electrode 26, CF 25, and CF side quarter λ phase difference plate 140, to reach the CF side polarizer 78.

In the CF side reflection polarizer 78, the light straightly polarized in a certain direction (a specified direction) is reflected to be a reflected light (arrow Lr), and the light straightly polarized in a perpendicular direction is transmitted to be a transmission light (arrow Ld).

At this time, by the quantity of birefringence of the liquid crystal 16 layer determined by the voltage applied to the TFT array side transparent electrode 23, the reflectivity of the reflected light (arrow Lr) reflected by the CF side reflection polarizer 78 varies from 0 to 1, and at the same time, the transmissivity of the transmission light (arrow Ld) varies from 1 to 0. In result, the image can be displayed by setting the voltage applied to the TFT array side transparent electrode 23 in every pixel depending on the image.

Next, referring to FIGS. 12 (a) and 12 (b), there is explained effects obtained when the reflection polarizer 78 is disposed between the second substrate (CF side glass substrate 15) and the second electrode (CF side transparent electrode 26).

As shown in FIG. 12(b), when the color filter (CF) side reflection polarizer 78 is adhered to the outer side of the CF side glass substrate 15, as compared with the width of 50 to 100 µm at the narrower side of one pixel of an ordinarily rectangular CF 25, the thickness of the CF side glass substrate 15 is as much as 300 to 700 µm, and therefore the distance from the CF side reflection polarizer 78 to the CF 25 (the thickness totaling the CF side glass substrate 15, CF side quarter λ phase difference plate 140, and half of CF side reflection polarizer 78) is 500 to 900 µm, which is about 10 times longer than the width of the pixel of the CF 25, and hence a depth angle $θ_B$ of the width of one pixel of the CF 25 from the CF side reflection polarizer 78 is small, about 3 degrees.

Therefore, the majority of the light reflected by the reflection polarizer 78 passes through a CF pixel of a different color adjacent to the CF pixel passing at the time of incidence, and since the transmission wavelength is different, re-absorption is sufficient, and about ⅔ of the light is re-absorbed in average. Therefore, bright reflected image is not obtained.

As known from a simple geometric calculation, when the light enters the CF side glass substrate 15 of refractive index of 1.5 from the direction of 30 degrees of the largest quantity of external light incidence, preferably, by setting the glass thickness within two times of the width of the narrower side of the CF 25, the possibility of the reflected light passing the same CF pixel as at the time of incidence is higher, and re-absorption is smaller, so that the reflectivity is higher.

When using the light of the front light 6, the divergence angle is about 15 degrees, and in this case where the thickness of the glass is set in a dimension of within 5 times of the width of the narrower side of the CF 25, the possibility of the reflected light passing the same CF pixel as at the time of incidence is higher, and re-absorption is smaller, so that the reflectivity is higher. Therefore, in the double-sided display type liquid crystal display device 10 of the foldable mobile phone according to Embodiment 3, by defining the thickness of the second glass substrate for adhering thereto the reflection polarizer 58 within 5 times, preferably 2 times of the width of the narrower side of the color filter pixel, a reflected image of high reflectivity can be visually recognized from the front light 6 side.

By contrast, as shown in FIG. 12(a), in this Embodiment having the CF side reflection polarizer 78 adhered to the inner side of the CF side glass substrate 15, the distance from the CF side reflection polarizer 78 to the CF 25 (the thickness totaling the CF side quarter λ phase difference plate 140, and half of CF side reflection polarizer 78) is short, about 50 to 100 μm, and hence the depth angle $\theta_A$ is large, about 25 to 90 degrees. In result, the possibility of the reflected light (arrow Lr) passing the pixel of the same CF 25 as the incident light (arrow Li) is higher. Therefore, the possibility of the incident light (arrow Li) and reflected light (arrow Lr) passing the pixels of the color filter 25 of different colors is lowered, and re-absorption of the reflected light (arrow Lr) by the CF 25 at the time of passing the CF 25 is suppressed, and the reflectivity is much enhanced.

Thus, when the CF 25 is disposed at the second electrode side instead of the first electrode side, and the reflection polarizer 78 is disposed between the second substrate (CF side glass substrate 17) and second electrode (CF side transparent electrode 26), the reflectivity is largely enhanced in reflection type display, so that a bright display is realized.

Further, in the reflection type display, since second substrate 17 is not present between the reflecting means 78 and first polarizing means 19, as compared with the case of disposing the second substrate 17 shown in FIG. 12(b), the optical path is shortened, and hence the parallax in display image is decreased.

As explained so far, the reflection polarizer 78 is adhered to the color filter 25, but the present invention is not limited to this, and the same effects are obtained when adhered to the TFT array side substrate 17.

However, since the reflection polarizer 78 is made of resin, it cannot withstand high temperature process, and it is better to adhere to the color filter 25 which is relatively lower in process temperature, in which degeneration of the reflection polarizer 78 (deterioration of reflection polarizing characteristic) in the high temperature process is smaller, and hence the reflectivity is enhanced largely.

Embodiment 5

Figure 13:
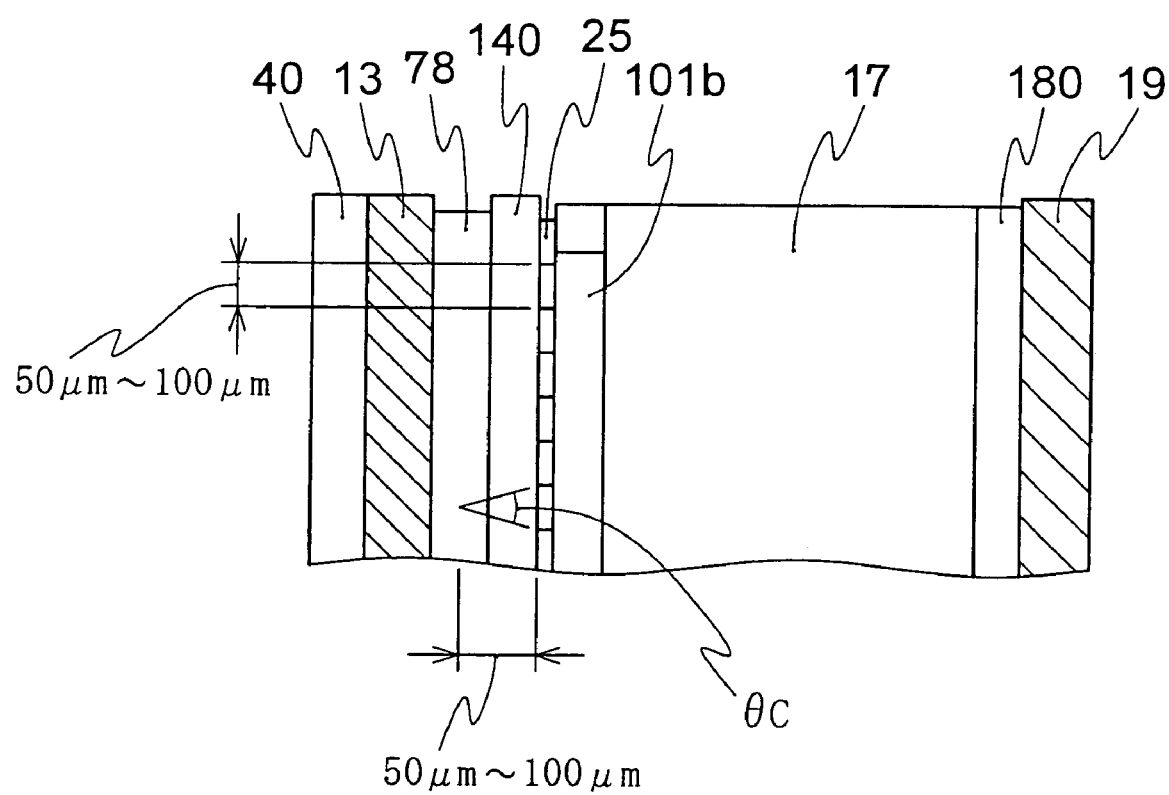
FIG. 13 is a diagram explaining a double-sided display type liquid crystal display device and an information appliance using the same according to Embodiment 5 of the present invention.
Figure 14A:
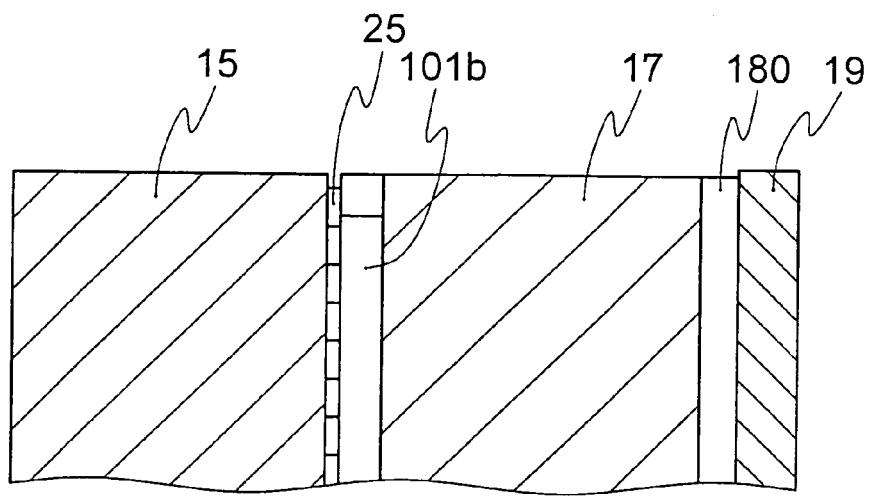
FIGS. 14(a), 14(b), and 14(c) are diagrams explaining the double-sided liquid crystal display device and the information appliance using the same according to Embodiment 5 of the present invention.
Figure 14B:
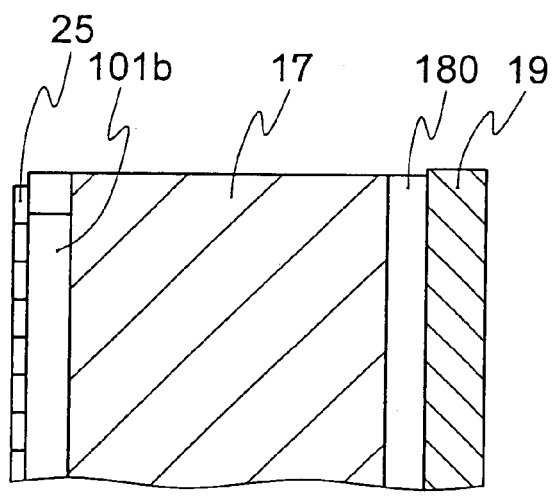
Figure 14C:
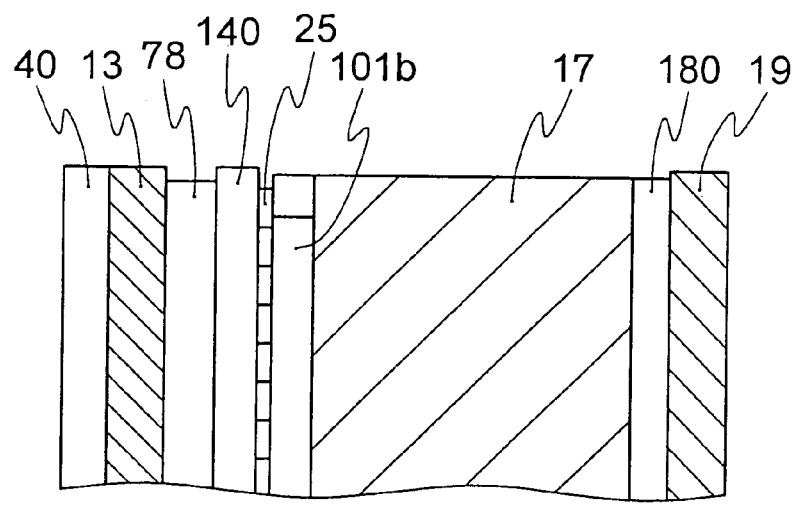

FIG. 13 and FIG. 14 are diagrams explaining a double-sided display type liquid crystal display device and an information appliance using the same according to Embodiment 5 of the present invention, and more specifically, FIG. 13 is a sectional view of essential parts of the double-sided display type liquid crystal display device, and FIG. 14(a) to (c) are sectional views explaining a manufacturing method of the double-sided display type liquid crystal display device in FIG. 13.

The double-sided display type liquid crystal display device and the information appliance using the same of the Embodiment are similar to Embodiment 4, except that the second substrate (CF side glass substrate 15) is omitted.

In this Embodiment, since the second substrate (CF side glass substrate 15) is omitted, there is no glass substrate between the CF side reflection polarizer 78 and the CF 25. Therefore, same as explained in Embodiment 4 using FIG. 12(a), the depth angle $\theta_C$ of width of one pixel of the CF 25 from the CF side reflection polarizer 78 is large, about 25 to 90 degrees, and the reflectivity in reflection type display is largely enhanced.

Further, in reflection type display, since there is no second substrate between the reflecting means 78 and first polarizing means 19, as compared with the case where the second substrate 17 exists as shown in FIG. 12(b), the optical path is shorter, and hence the parallax in the display image is reduced.

Further, in this Embodiment, since the second substrate (CF side glass substrate 15) is omitted, the weight is reduced at the same time.

Referring now to FIG. 14, the manufacturing method of the double-sided display type liquid crystal display device of the Embodiment is explained.

First, the TFT array side glass substrate 17 (first substrate) and CF side glass substrate 15 (second substrate) are adhered together with a gap being provided therebetween to form a cell, and the gap is filled with liquid crystal 16 to form a liquid crystal cell, and then a TFT array side quarter λ phase difference plate 180 (first quarter λ phase difference plate) and a TFT array side polarizer 19 (first polarizer) are adhered to the TFT array side glass substrate 17 (FIG. 14(a)).

Electrode terminals and other metal parts formed on the two glass substrates 15 and 17 are sufficiently protected with inorganic material or organic material, and the entire structure is etched by hydrofluoric acid, and the CF side glass substrate 15 is removed (FIG. 14(b)).

A quarter λ phase difference plate 40 (second quarter λ phase difference plate), a reflection polarizer 78, a CF side polarizer 13 (second polarizer), a CF side quarter λ phase difference plate 140 (third quarter λ phase difference plate) are adhered to the CF 25 (FIG. 14(c)).

As explained so far, the first substrate is the TFT array side glass substrate 17, the second substrate is the CF side glass substrate 15, the CF side glass substrate 15 is removed, and the reflection polarizer 78 is adhered to the CF 25, but same effects are obtained, to the contrary, if the first substrate is the CF side glass substrate 15, the second substrate is the TFT array side glass substrate 17, the TFT array side glass substrate 17 is removed, and the reflection polarizer 78 is directly adhered to the TFT array.

Embodiment 6

Figure 15:
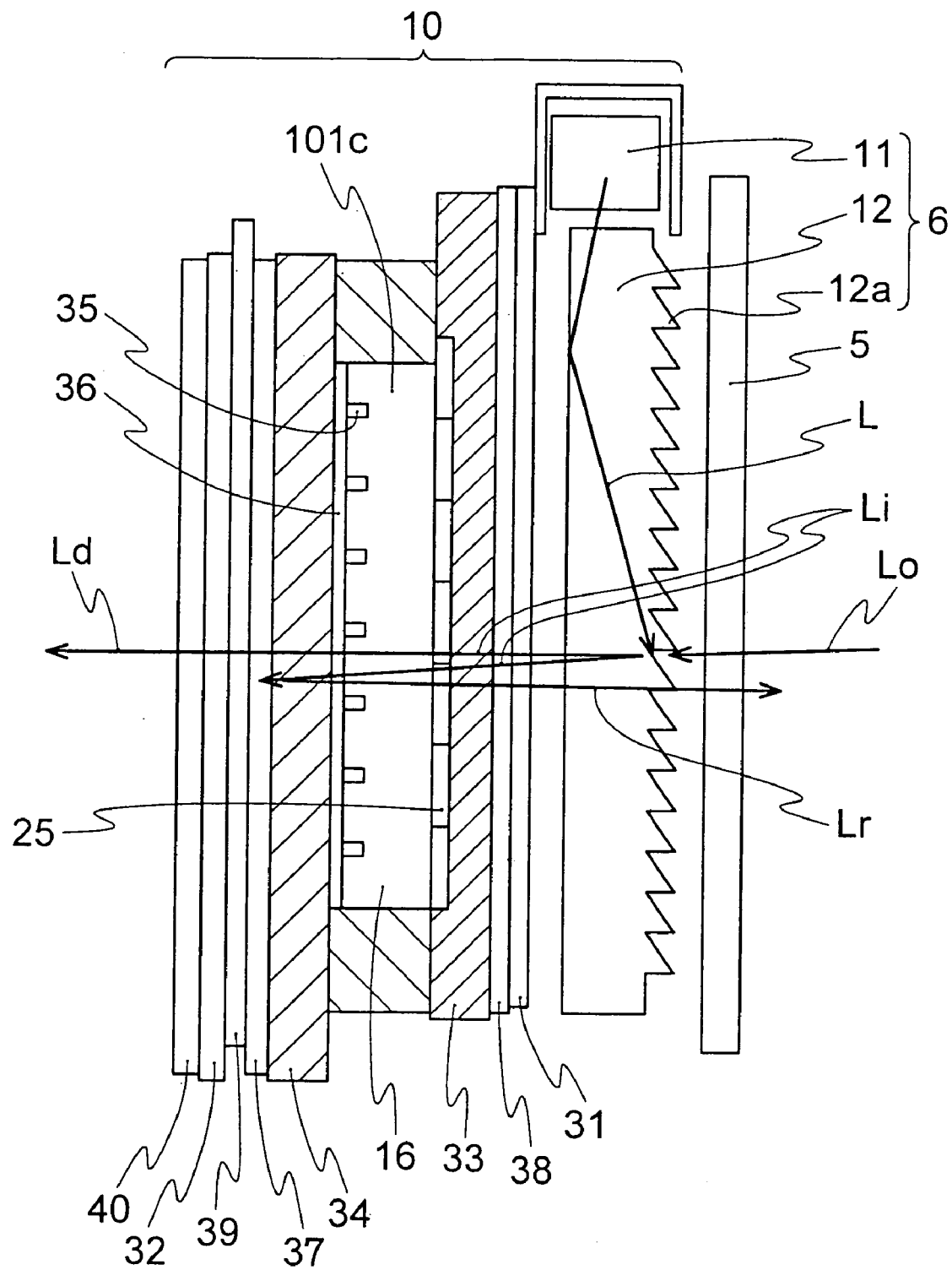
FIG. 15 is a diagram explaining a double-sided display type liquid crystal display device and an information appliance using the same according to Embodiment 6 of the present invention.

FIG. 15 is a diagram explaining a double-sided display type liquid crystal display device and an information appliance using the same according to Embodiment 6 of the present invention, and more specifically it is a sectional view of essential parts of the double-sided display type liquid crystal display device.

In FIG. 15, reference numerals 31 and 32 denote first and second polarizing means, respectively, disposed oppositely on both sides of a liquid crystal, and same polarizers as in the foregoing Embodiments are used. Reference numerals 33 and 34 denote first and second substrates, respectively, disposed between the liquid crystal 16 layer and the first and second polarizing means 31 and 32, respectively, and same glass substrates as in the foregoing Embodiments are used.

Reference numerals 35 and 36 denote first and second electrodes for driving the liquid crystal 16 and controlling its quantity of birefringence. In the foregoing Embodiments, the first and second electrodes are disposed between the liquid crystal 16 layer and the first and second polarizing means, respectively, and the liquid crystal 16 layer is held between the first and second electrodes, but in this Embodiment, the first and second electrodes 35 and 36 are both disposed between the second polarizing means 32 and liquid crystal 16. More specifically, the first electrode 35 and second electrode 36 are both disposed on the surface of the second substrate 34 as mutually engaged tooth-shaped electrodes, and the liquid crystal 16 is driven by an electric field formed by the first electrode 35 and second electrode 36 and having components parallel to the surface of the second substrate 34.

Reference numerals 37 and 38 denote second and third quarter λ phase difference plates, and same plates as in the foregoing Embodiments are used. Reference numeral 39 denotes a reflection polarizer for reflecting the light polarized straightly in a specified direction, and transmitting the light straightly polarized in a direction perpendicular to the specified direction, and the same one as in the foregoing Embodiments is used.

Reference numeral 101*c* denotes a liquid crystal display panel having a liquid crystal 16, and first and second electrodes 35 and 36 for driving the liquid crystal 16, and in this Embodiment, this is a total transmission type liquid crystal display panel for transmitting all light passing through the liquid crystal 16. Such total transmission type liquid crystal display panel 101*c* is disclosed in, for example, Japanese Examined Patent Publication No. 21907/1998, and it is usually called a liquid crystal panel of IPS (in-plane switching: lateral electric field application) system. In contrast to this, the total transmission type liquid crystal display panel 101*b* shown in Embodiment 3 is called a liquid crystal display panel of longitudinal electric field application system.

The double-sided display type liquid crystal display device and information appliance using the same according to this Embodiment are same as the double-sided display type liquid crystal display device and information appliance using the same according to Embodiment 3, except that the total transmission type liquid crystal display panel 101*c* of lateral electric field application system is used instead of the total transmission type liquid crystal display panel 101*b* of longitudinal electric field application system, and mainly the location and structure of the first and second electrodes and direction of electric field for driving the liquid crystal 16 are different, and other structure and operation are same as in Embodiment 3.

Although description of the operation is omitted, in this Embodiment, too, same as in Embodiment 3, the light straightly polarized in a specified direction, that is, a part of the light passing from the front light side to the liquid crystal 16 and reaching the reflection polarizer 39 is reflected by the reflection polarizer 39, and reaches the first polarizing means 31, and the remainder, that is, the light straightly polarized in a direction perpendicular to the specified direction passes through the reflection polarizer 39, and reaches the second polarizing means 32. In result, the display image can be visually recognized from both sides of the first polarizing means 31 side and second polarizing means 32 side.

Further, though the external light illuminating the liquid crystal display device from the second polarizing means 32 side is a factor of lowering the contrast of the transmission type display image, since the second polarizing means 32 absorbs the straight polarized light in the direction of reflection of the reflection polarizer 39, it is effective to heighten the contrast.

Effects of first, second and third quarter λ phase difference plates 40, 37 and 38 are same as in Embodiment 3.

As explained herein, both of the first electrode 35 and second electrode 36 are disposed between the second polarizing means 32 and liquid crystal 16, but the first electrode 35 and second electrode 36 might be also disposed between the first polarizing means 31 and liquid crystal 16, and same effects are obtained.

As semitransmission reflecting means, the reflection polarizer 39 is disposed between the first quarter λ phase difference plate 37 and second polarizing means 32, but instead of the reflection polarizer 39, by using a reflector having transmission window (for example, an aluminum vapor deposition mirror film having multiple fine transmission windows) same as explained in Embodiment 1, the reflector having transmission window might be adhered, for example, to the liquid crystal 16 side of the second substrate 34.

So far, there is shown a case where, in the double-sided display type liquid crystal display device and information appliance using the same according to Embodiment 3, the total transmission type liquid crystal display panel 101*c* of lateral electric field application system is used instead of the total transmission type liquid crystal display panel 101*b* of longitudinal electric field application system. The present invention is not, however, limited to this, and in the double-sided display type liquid crystal display device and information appliance using the same according to Embodiment 4 or 5, similarly, the total transmission type liquid crystal display panel 101*c* of lateral electric field application system might be used instead of the total transmission type liquid crystal display panel 101*b* of longitudinal electric field application system.

Embodiment 7

Figure 16:
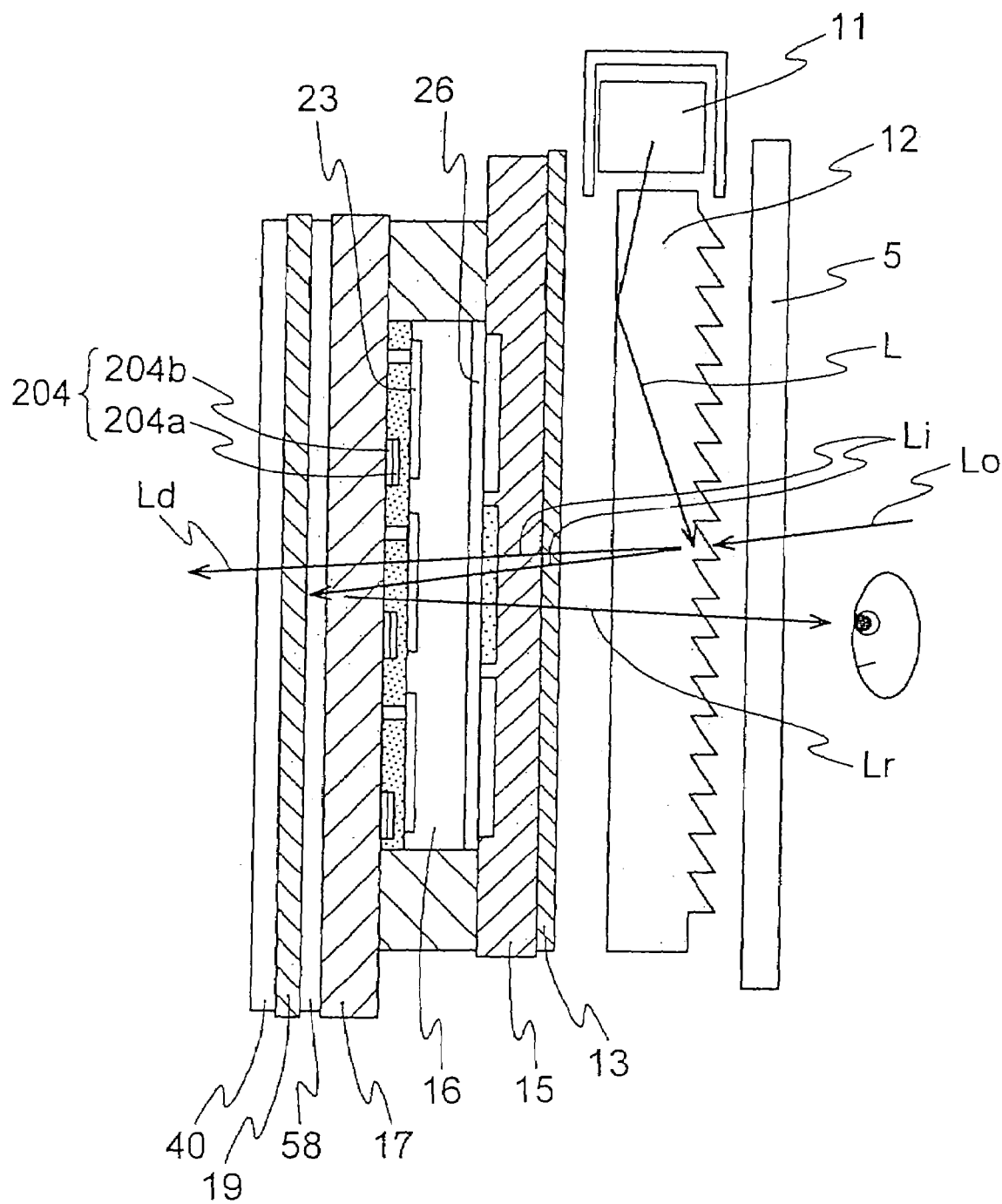
FIG. 16 is a diagram explaining a double-sided display type liquid crystal display device and an information appliance using the same according to Embodiment 7 of the present invention.
Figure 17:
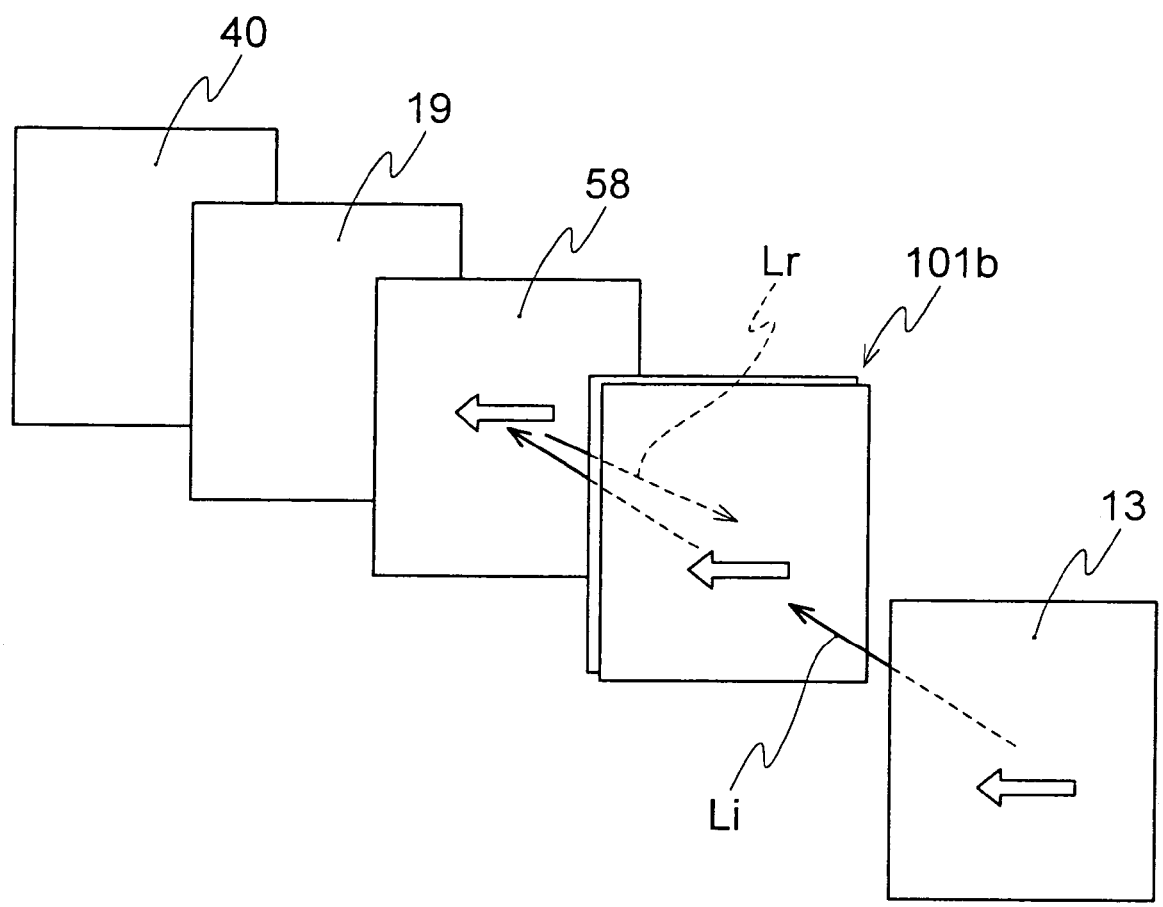
FIG. 17 is a diagram explaining the double-sided display type liquid crystal display device and the information appliance using the same according to Embodiment 7 of the present invention.
Figure 18:
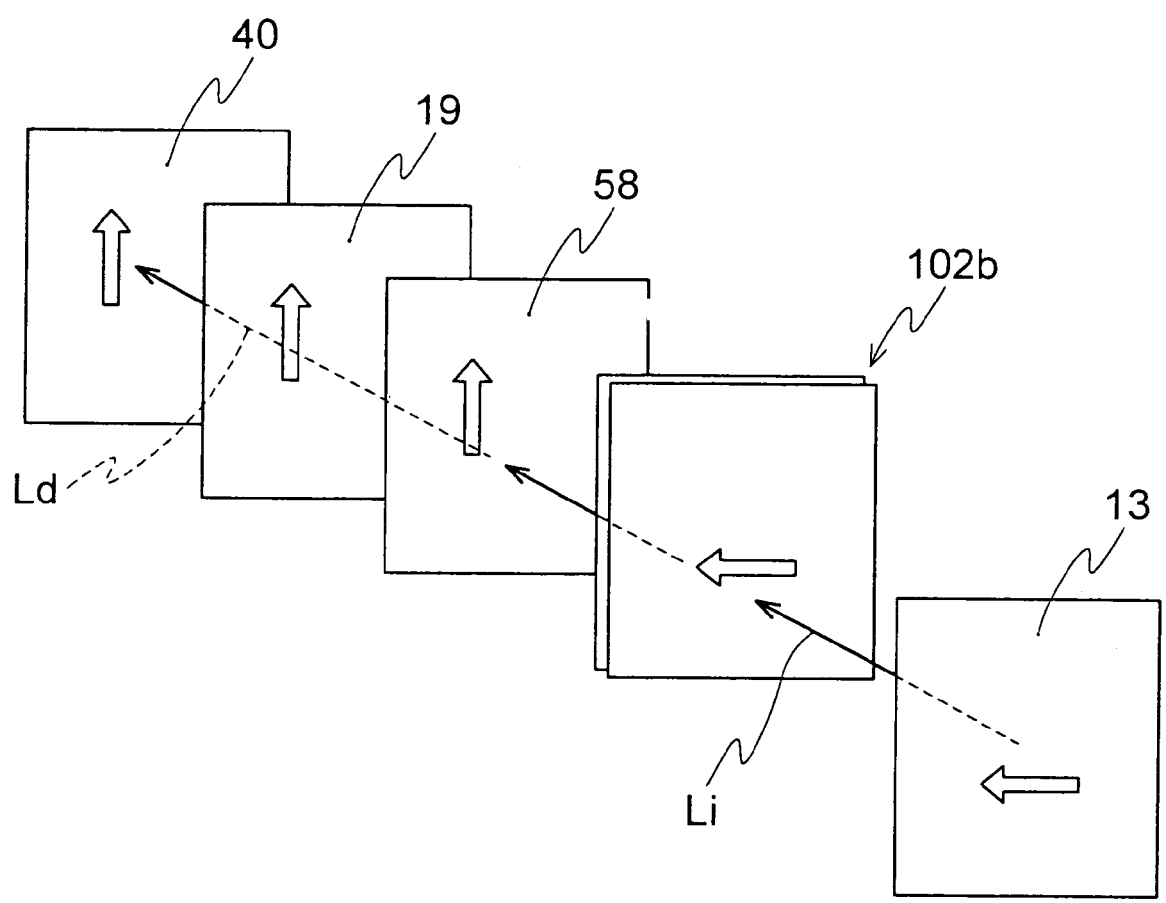
FIG. 18 is a diagram explaining the double-sided display type liquid crystal display device and the information appliance using the same according to Embodiment 7 of the present invention.
Figure 19:
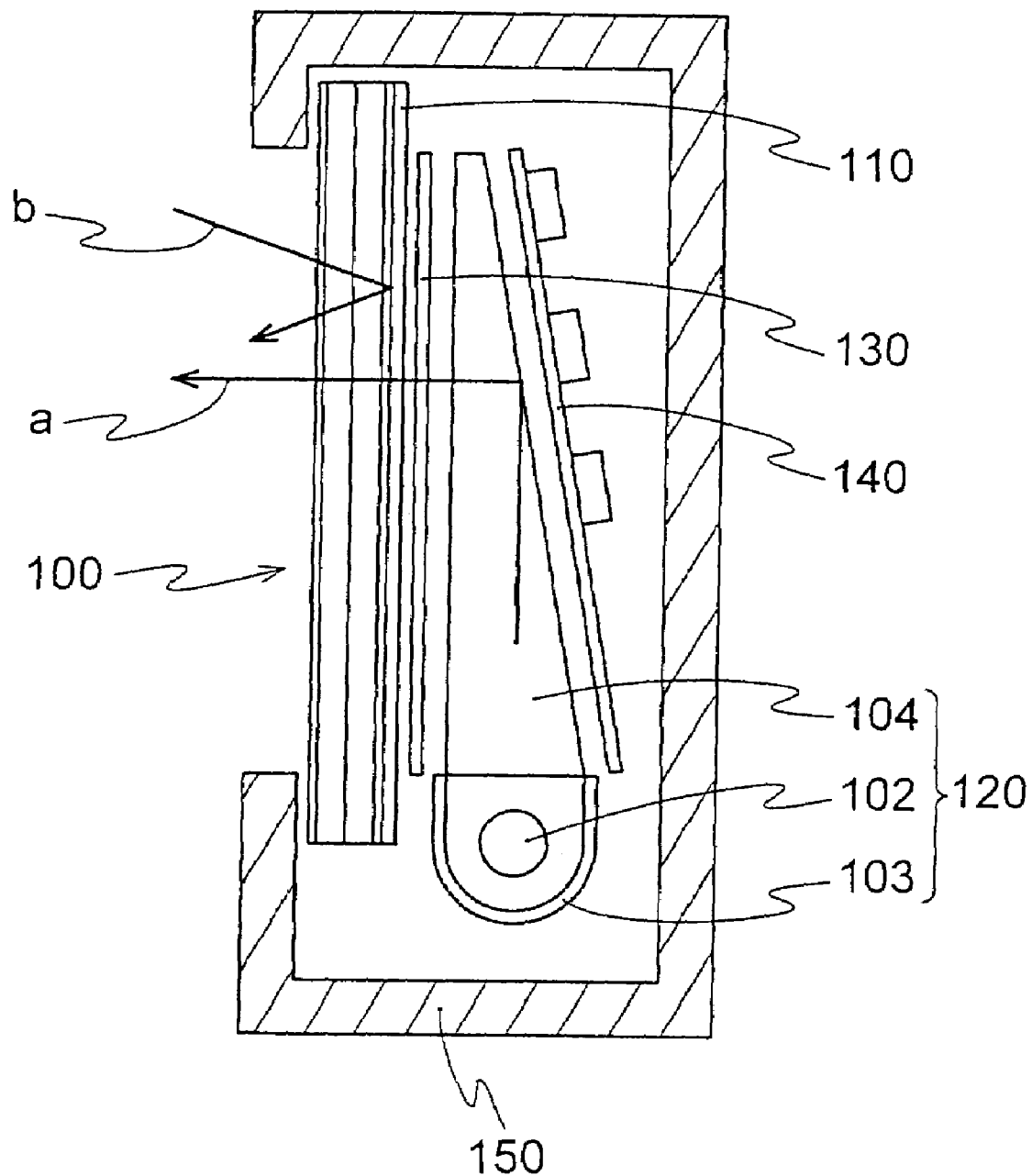
FIG. 19 is a diagram explaining a semitransmission reflection type liquid crystal display device in Prior Art 2.
Figure 20:
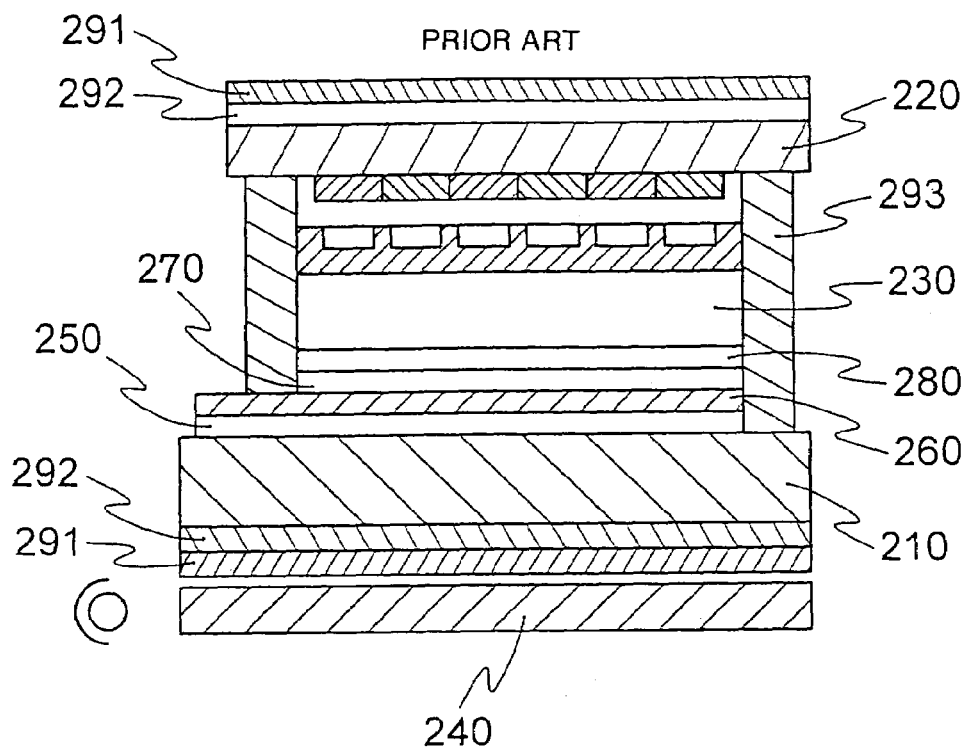
FIG. 20 is a diagram explaining a semitransmission reflection type liquid crystal display device in Prior Art 3.
Figure 21:
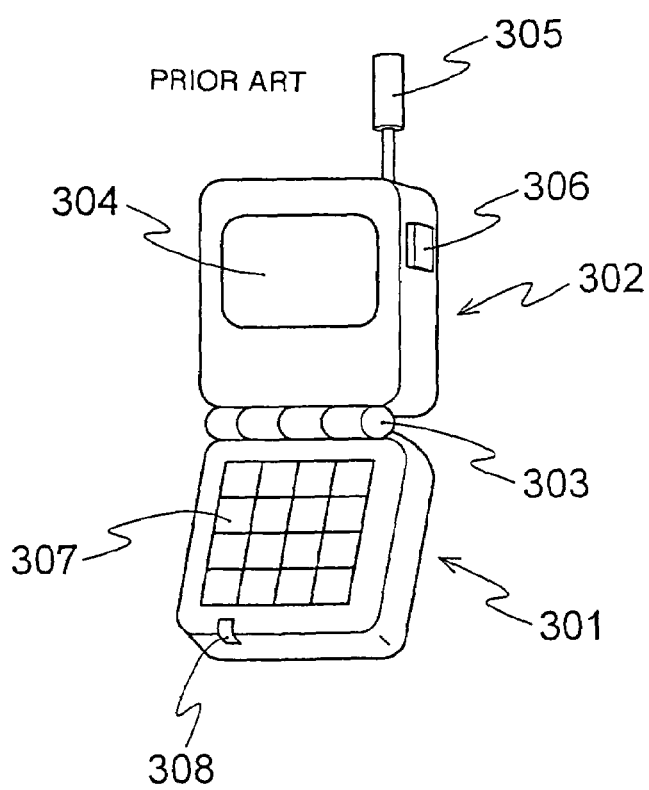
FIG. 21 is a diagram explaining an information appliance in Prior Art 4.

FIG. 16 to FIG. 18 are diagrams explaining a double-sided display type liquid crystal display device and an information appliance using the same according to Embodiment 7 of the invention, and more specifically FIG. 16 is a magnified sectional view of essential parts of a foldable mobile phone as an information appliance, and FIG. 17 and FIG. 18 are explanatory diagrams showing examples of the direction of polarization of each light shown in FIG. 16.

In FIG. 16, reference numeral 204*a* denotes a conductive layer made of metal such as chromium or aluminum disposed at the liquid crystal 16 side, and 204*b* a low reflection layer made of, for example, chromium oxide lower in reflectivity of light than the conductive layer 204*a*, being disposed at the opposite side (second substrate 17 side) of the liquid crystal 16. In this Embodiment, the metal wiring 204 disposed in the second substrate (TFT array side glass substrate 17) for supplying voltage to the second electrode (TFT array side transparent electrode 23) has a two-layer structure of conductive layer 204*a* and low reflection layer 204*b*.

Usually, the metal wiring 204 of, for example, source wiring or gate wiring is formed by etching and patterning the film of chromium or aluminum formed on the glass substrate by sputtering or the like, and therefore the surface of the glass substrate side is a mirror-smooth surface of high reflectivity. Therefore, as explained in Embodiment 3, the light passing through the TFT array side polarizer 19 and TFT array side reflection polarizer 58, out of the external light (arrow Lo) illuminating the double-sided display type liquid crystal display device from the second polarizing means 19 side, is reflected by the metal wiring 204 formed on the TFT array side glass substrate 17, which is a cause to lower the contrast.

To prevent this, in Embodiment 3, the first quarter λ phase difference plate (TFT array side quarter λ phase difference plate 180) is provided to prevent the light reflected at the metal wiring 204 from passing again through the reflection polarizer 58.

In this Embodiment, in contrast thereto, the low reflection layer 204*b* of lower reflection of light than that of the conductive layer 204*a* is formed on the TFT array side glass substrate 17, and the conductive layer 204*a* is formed thereon to realize the metal wiring 204 of two-layer structure.

Since the metal wiring 204 has a two-layer structure, the light passing through the TFT array side polarizer 19 and TFT array side reflection polarizer 58 and reaching the metal wiring 204, out of the external light (arrow Lo) illuminating the double-sided display type liquid crystal display device from the second polarizing means 19 side, reaches the low reflection layer 204*b*, and reflection is suppressed, thereby preventing decline of contrast by the reflected light by the metal wiring 204.

With the use of FIG. 16 to FIG. 18, the operation of the double-sided display type liquid crystal display device of the Embodiment is explained below, mainly by referring to the different points from Embodiment 3.

The light emitted from the light source 11 (arrow L) spreads by diffusing and propagating through the light-conducting plate 12, and is radiated by the reflection prism 12a provided in the light-conducting plate 12 to the CF side polarizer 13 side. The radiated light (arrow Li) is straightly polarized by the CF side polarizer 13 (in FIG. 17 and FIG. 18, a straightly polarized light in the lateral direction), and reaches the total transmission type liquid crystal display panel 101d.

In the total transmission type liquid crystal display panel 101d, when voltage is applied between the CF side transmission electrode 26 and TFT array side transparent electrode 23, the direction of polarization is not rotated as shown in FIG. 17, and the light is directly transmitted in the lateral direction and is reflected by the reflection polarizer 58. The reflected light (arrow Lr) passes again through the total transmission type liquid crystal display panel 101d, CF side polarizer 13, front light 6, and transparent cover 5, and is visually recognized by the user at the front light 6 side of the double-sided display type liquid crystal display device 10 (reflection type display).

In the total transmission type liquid crystal display panel 101d, when voltage is not applied between the CF side transmission electrode 26 and TFT array side transparent electrode 23, the direction of polarization is rotated by 90 degrees by the liquid crystal layer as shown in FIG. 18, and the light is straightly polarized in the longitudinal direction and is issued, and passes through the reflection polarizer 58, TFT array side polarizer 19 and second quarter λ phase difference plate 40, and is visually recognized by the user at the second polarizer (TFT array side polarizer 19) side of the double-sided display type liquid crystal display device 10 (transmission type display).

As explained so far, in Embodiment 3, the metal wiring (source wiring) 204 for supplying a voltage to the TFT array side transparent electrode 23 is a two-layer structure consisting of the conductive layer 204a disposed at the liquid crystal 16 side, and a low reflection layer 204b of lower reflectivity of light than that of the conductive layer 204a disposed at the opposite side (TFT array glass substrate 17 side) of the liquid crystal 16, but in other Embodiments, other metal wiring (gate wiring) for supplying a voltage to the first electrode or second electrode might be also composed of a metal wiring of two-layer structure, in which similar effects are obtained.

Preferably, the metal wiring formed at the position closest to the TFT array glass substrate 17 is formed in a two-layer structure of the conductive layer 204a and the low reflection layer 204b of lower reflectivity of light than that of the conductive layer 204a same as mentioned above. By etching and patterning, simultaneously when forming the wiring, the film for two-layer structure metal wiring in a shape for shielding optically, in order to suppress the reflection of electric elements of higher reflectivity such as other metal wiring or transistor formed nearer to the liquid crystal 16 than the metal wiring layer, if there is reflection of other member such as transistor, a low reflection layer is formed similarly at the opposite side of the liquid crystal 16 layer of the member, so that lowering of contrast can be prevented. At this time, an insulating layer might be interposed between other member such as transistor and the low reflection layer.

The low reflection layer 204b is preferred to be black, but the color is not specifically limited.

The low reflection layer 204b is not required to be a completely black two-layer structure, but similar effects are expected as far as it is disposed optically closely in a shape conforming to the shape of the conductive layer 204a. In the two-layer structure, however, since the process is finished by one step of transfer, the cost is lower.

The technical scope of the present invention is not limited to the foregoing Embodiments 1 to 7, but might be changed and modified in various manners without departing from the spirit and scope of the present invention.

For example, the liquid crystal display device is not limited to the illustrated example of TFT system, but includes, for example, a simple matrix system LCD (liquid crystal display device). The writing manner of the TFT liquid crystal panel is not limited to the so-called line sequential system, but same effects are obtained, for example, by the dot sequential system by varying vertical direction of writing.

In the foregoing Embodiments, the surface of the front light 6 side of the double-sided display type liquid crystal display 10 is disposed at the outer side of the second main body 3, and the surface of the second polarizing means 19 side of the double-sided display type liquid crystal display 10 is disposed at the inner side. But the direction of location of the double-sided display type liquid crystal display 10 might be inverted, and in such a case, when the second main body 3 is opened, the reflection type display with front light 6 is realized, and the display image can be visually recognized by illumination of external light or front light 6. Therefore, in the case where external light is sufficiently available, the display image can be visually recognized without consuming the electric power by lighting the front light 6. When the second main body 3 is closed, by using the front light 6 as the light source of the backlight, transmission type display is realized, and the display image can be visually recognized by lighting of the front light 6.

From the viewpoint of saving the power consumption by lighting of the front light 6, the direction of location of the double-sided display type liquid crystal display 10 might be determined depending on the duration of the time of opening state or closing state of the second main body 3.

The above explanation is made based on mobile phone as an example, but the present invention is not limited to this, and similar effects are obtained in any other information appliance comprising a first main body having various operation switches and a second main body having display means for visibly displaying various kinds of information, such as foldable PDA, foldable wristwatch having a first main body fixed to the wrist, and foldable calculator.

For example, in a foldable PDA, when the second main body is closed, the image to be displayed in the double-sided display type liquid crystal display includes, for example, the calendar, clock, schedule, illustration, portrait, game application, map, internet HP, decorative pattern, and decorative illumination, and when the second main body is opened, the image to be displayed in the double-sided display type liquid crystal display includes the document writing screen, mail operation screen, setting screen or the like.

In a foldable wristwatch, when the second main body is closed, the image to be displayed in the double-sided display type liquid crystal display includes, for example, the calendar and the clock, and when the second main body is opened, the image to be displayed in the double-sided display type liquid crystal display includes the alarm setting screen, schedule setting screen or the like.

In the Embodiments explained so far, the double-sided display type liquid crystal display of the invention is used as the display device of the information appliance, and the information appliance is designed to recognize the display image visually by the same liquid display device both in the cases where the second main body having the display device is opened and where the same is closed, but the present invention is not limited to this, and it might be also used as the display device serving also as a cover for concealing the setting switch in an appliance having a setting switch not used in ordinary operation, such as refrigerator, microwave oven, room cooler and other electric household appliance. Moreover, in the double-sided display type liquid crystal display of the invention, since the display image can be recognized simultaneously from both sides of the first polarizing means side and second polarizing means side, it can be also used as a display device for face-to-face game application played by two players sitting opposite to each other.

Thus, according to the double-sided display type liquid crystal display of the present invention comprising a liquid crystal, first and second electrodes for driving the liquid crystal, first and second polarizing means disposed on both sides of the liquid crystal, a front light disposed at the opposite side of the liquid crystal of the first polarizing means, and semitransmission reflecting means disposed at the second polarizing means side of the liquid crystal for passing a part of light from the front light side passing through the liquid crystal, in which the first polarizing means is optically disposed so as to absorb or transmit the light passing through the liquid crystal, and the second polarizing means is optically disposed so as to absorb or transmit the light passing through the liquid crystal and then passing through the semitransmission reflecting means. Therefore, the light, both front light and external light, reaching the semitransmission reflecting means by passing through the first polarizing means and liquid crystal from the front light side partly passes through the semitransmission reflecting means and reaches the second polarizing means, and the light dimmed according to the driving state of the liquid crystal passes through the second polarizing means to be radiated to outside of the double-sided display type liquid crystal display device (transmission type display). At this time, if the surrounding is bright, the external light entering the liquid crystal from the second polarizing means is not reflected, so that transmission type display of high contrast is realized. A part of the light is reflected by the semitransmission type reflecting means and passes again the liquid crystal to reach the first polarizing means, and the light dimmed according to the driving state of the liquid crystal passes through the first polarizing means, and further passes through the front light to be radiated to outside of the double-sided display type liquid crystal display device (reflection type display). In result, a bright display screen of excellent display quality can be recognized from both sides of the first polarizing means side and second polarizing means side.

Further, the semitransmission reflecting means is a reflector disposed between the liquid crystal and the second polarizing means, and having a transmission window for passing a part of the light from the front light side passing through the liquid crystal, so that the light reaching the reflector after passing through the first polarizing means and liquid crystal from the front light side partly passes through the transmission window of the reflector to reach the second polarizing means, while the remainder is reflected by the reflector to reach the first polarizing means. In result, the display image can be visually recognized from both sides of the first polarizing means side and second polarizing means side.

The first and second electrodes are transparent electrodes disposed between the liquid crystal and first polarizing means and the liquid crystal and second polarizing means respectively, and the reflector having a transmission window is disposed at the opposite side of the liquid crystal of the second electrode, so that the light reaching the reflector having the transmission window after passing through the first polarizing means, first electrode, liquid crystal, and second electrode from the front light side partly passes through the transmission window of the reflector to reach the second polarizing means, and the remainder is reflected by the reflector to reach the first polarizing means. In result, the display image can be visually recognized from both sides of the first polarizing means side and second polarizing means side.

Moreover, the semitransmission reflecting means is a reflection polarizer disposed between the liquid crystal and the second polarizing means, for reflecting the light having a specified polarizing characteristic and passing all other light, so that the light having a specified polarizing characteristic which is a part of the light reaching the reflection polarizer after passing through the liquid crystal from the front light side is reflected by the reflection polarizer to reach the first polarizing means, and the remaining light mostly passes through the reflection polarizer to reach the second polarizing means, thereby the display image can be visually recognized from both sides of the first polarizing means side and second polarizing means side. At this time, for the light of the specified polarizing characteristic, since the entire surface of the reflection polarizer is the reflection plane, a high reflectivity is expected, while for the other light than the light of the specified polarizing characteristic, to the contrary, since the entire surface of the reflection polarizer is the transmission plane, a high transmissivity is expected.

Further, the device includes first and second glass substrates holding the liquid crystal therebetween and disposed between the liquid crystal and the first and second polarizing means respectively, and a color filter provided at a liquid crystal side of either first or second glass substrate, a reflection polarizer is adhered to the opposite side of the liquid crystal of the second substrate, and the thickness of the second substrate is 5 times or less of the narrowest width of the color filter, so that re-absorption of reflected light by the color filter can be suppressed, thereby a bright reflected image can be visually recognized.

Further, the device includes a metal wiring electrically connected to the first electrode or second electrode, a first quarter λ phase difference plate is disposed between the metal wiring and first polarizing means when the metal wiring is located between the liquid crystal and the first polarizing means, or between the metal wiring and reflection polarizer when the metal wiring is located between the liquid crystal and reflection polarizer, so that when the metal wiring is located between the liquid crystal and first polarizing means, a part of the light passing through the first polarizing means is reflected by the metal wiring, but the direction of polarization is rotated by 90 degrees since the reflected light has already passed the quarter λ phase difference plates by two reciprocal strokes, so that the light cannot pass the first polarizing means again. On the other hand, when the metal wiring is located between the liquid crystal and the reflection polarizer, a part of the external light passing through the second polarizing means and reflection polarizer is reflected by the metal wiring, but the direction of polarization is rotated by 90 degrees since the reflected light has already passed the quarter λ phase difference plates by two reciprocal strokes, so that the light cannot pass the reflection polarizer again. Therefore, the reflected light by the metal wiring does not reach up to the eyes of the observer, and lowering of contrast by reflected light from the metal wiring can be prevented.

Further, the device includes a metal wiring electrically connected to the first electrode or second electrode, and a low reflection layer of lower reflectivity of light than that of the metal wiring is disposed at the opposite side of the liquid crystal of the metal wiring, being disposed optically closely in a shape after the metal wiring, so that a part of the light passing through the polarizing means at the opposite side of the liquid crystal of the metal wiring is reflected by the surface of the metal wiring, but the reflection is suppressed by the low reflection layer, thereby a high contrast might be obtained.

An information appliance of the present invention is an information appliance comprising a first main body having various operation switches, and a second main body having display means for visually displaying various kinds of information, being coupled to the first main body in an opening and closing manner, in which the display means is a double-sided display type liquid crystal display device comprising a liquid crystal, first and second electrodes for driving the liquid crystal, first and second polarizing means disposed on both sides of the liquid crystal, a front light disposed at the opposite side of the liquid crystal of the first polarizing means, and semitransmission reflecting means disposed at the second polarizing means side of the liquid crystal for passing a part of light from the front light side passing through the liquid crystal, and in which windows are disposed at the inner side of the casing of the inside and at the outer side of the outside when the second main body is closed, the surface of the front light side of the double-sided display type liquid crystal display device is disposed at one window, and the surface of the second polarizing means side of the double-sided display type liquid crystal display device is disposed at the other. Therefore, without requiring an extra image display device, the display image can be visually recognized by a same liquid crystal display device both in the case where the second main body is opened and in the case where the same is closed.

The surface of the front light side of the double-sided display type liquid crystal display device is disposed at the window provided at the outer side of the second main body, and the surface of the second polarizing means side of the double-sided display type liquid crystal display device is disposed at the window provided at the inner side, so that the reflection type display by the front light is possible when the second main body is closed, and the display image can be visually recognized by external light or lighting of front light. Therefore, in the case where external light is sufficiently available, the display image can be visually recognized without consuming electric power by lighting of the front light. Also in the case where the second main body is opened, transmission type display using front light as the light source of backlight is possible, and the display image can be visually recognized by lighting the front light.

The appliance further includes opening/closing judging means for judging the opening or closing of the second main body, and a front light lighting switch which cooperates with the opening/closing judging means for lighting the front light when the main body is judged to be opened, so that when the second main body is opened, the front light lights up automatically, and the display image can be visually recognized.

The appliance further includes writing direction inverting means for inverting the writing direction of display image data into each pixel of the double-sided display type liquid crystal display device in the vertical or lateral direction, so that when the second main body opens and closes in the vertical direction, the writing direction of the display image data into each pixel of the double-sided display type liquid crystal display device is inverted in the vertical direction depending on the opening or closing state of the second main body, while in the case of opening and closing in the lateral direction, it is inverted in the lateral direction, thereby display image in the correct direction can be visually recognized without changing the holding position when opening or closing the second main body.

The appliance further includes data converting means for converting the data of display image into data inverted in the vertical or lateral direction, so that when the second main body opens and closes in the vertical direction, the display image data is shuffled upside down depending on the opening or closing state of the second main body, while in the case of opening and closing in the lateral direction, it is inverted by shuffling right and left, thereby the display image in the correct direction can be visually recognized without changing the holding position when opening or closing the second main body.

The appliance further includes data converting means for converting the gradation of the data of display image, so that the display is shown always in correct color both in the case where the second main body is opened and in the case where it is closed.

The appliance further includes a second quarter λ phase difference plate disposed at the opposite side of the liquid crystal of the second polarizing means of the double-sided display type liquid crystal display device, so that when viewing the display screen of the first polarizing means side with the display screen of the second polarizing means side being shielded, it is effective to suppress the light transmitted to the second polarizing means side from the semitransmission reflecting means from reflecting at random by the shielding body to re-enter the liquid crystal display device, and hence color oozing, image blurring and contrast lowering can be suppressed.

INDUSTRIAL APPLICABILITY

A double-sided display type liquid crystal display capable of displaying bright images of excellent display quality at both face and reverse sides is presented, and moreover display images can be visually recognized in one liquid crystal display device both in the case where a second main body is opened and in the case where closed.

The invention claimed is:

1. A double-sided liquid crystal display device comprising:
   first and second substrates, a liquid material disposed between the first and second substrates,
   first and second electrodes for driving the liquid crystal material,
   first and second polarizing means disposed on opposite sides of the first and second substrates,
   a phase difference plate disposed between the first polarizing means and the first substrate,
   a front light disposed on the opposite side of the first polarizing means from the liquid crystal material, and
   semitransmission reflecting means disposed on the same side of the liquid crystal material as the second polarizing means, for passing a part of light from the front light passing through the liquid crystal material, wherein
   the semitransmission reflecting means is a reflection polarizer, disposed between the liquid crystal material and the second polarizing means, reflecting light having a specified polarization and passing all other light,
   the first polarizing means is optically disposed to absorb or transmit light passing through the liquid crystal material,
   the second polarizing means is optically disposed to absorb or transmit light passing through the liquid crystal material and then passing through the semitransmission reflecting means, and
   part of the light passing through the second polarizing means and through the liquid crystal material is absorbed and the light not so absorbed is transmitted by the first polarizing means.

2. A double-sided liquid crystal display device comprising:
- first and second substrates, a liquid material disposed between the first and second substrates,
- first and second electrodes for driving the liquid crystal material,
- first and second polarizing means disposed on opposite sides of the first and second substrates,
- a one-quarter wavelength phase difference plate disposed between the second polarizing means and the second substrate,
- a front light source disposed on the opposite side of the first polarizing means from the liquid crystal material producing front light, and
- semitransmission reflecting means disposed on the same side of the liquid crystal material as the second polarizing means, for passing a part of the front light from the front light source that passes through the liquid crystal material, wherein
  - the semitransmission reflecting means is a reflection polarizer, disposed between the liquid crystal material and the second polarizing means, reflecting light having a specified polarization and passing all other light,
  - the first polarizing means is optically disposed to transmit the front light that then passes through the liquid crystal material and to transmit external light that is first incident on the second polarizing means and that, thereafter, passes through the liquid crystal material to reach the first polarizing means, and the second polarizing means is optically disposed to block or transmit the front light that has passed through the liquid crystal material and through the semitransmission reflecting means, whereby the external light first incident on and passing through the second polarizing means, the semitransmission reflecting means, and the one-quarter wavelength phase difference plate and entering the liquid crystal material, if reflected, is prevented from being transmitted through the second polarizing means by the one-quarter wavelength phase difference plate, independent of driving signals applied to the first and second electrodes for driving the liquid crystal material.

* * * * *